(12) United States Patent
Dholakia

(10) Patent No.: US 11,204,319 B2
(45) Date of Patent: Dec. 21, 2021

(54) IMAGING OF A SAMPLE THROUGH A SCATTERING MEDIUM

(71) Applicant: University Court of the University of St Andrews, College Gate, Fife (GB)

(72) Inventor: Kishan Dholakia, Fife (GB)

(73) Assignee: University Court of the University of St Andrews, Fife (GB)

( * ) Notice: Subject to any disclaimer, the term of this patent is extended or adjusted under 35 U.S.C. 154(b) by 0 days.

(21) Appl. No.: 16/649,563

(22) PCT Filed: Sep. 20, 2018

(86) PCT No.: PCT/GB2018/052684
§ 371 (c)(1),
(2) Date: Mar. 20, 2020

(87) PCT Pub. No.: WO2019/058122
PCT Pub. Date: Mar. 28, 2019

(65) Prior Publication Data
US 2020/0284724 A1    Sep. 10, 2020

(30) Foreign Application Priority Data
Sep. 22, 2017    (GB) ..................... 1715385

(51) Int. Cl.
*G01N 21/47*     (2006.01)
*G01N 21/17*     (2006.01)
*G01N 21/64*     (2006.01)

(52) U.S. Cl.
CPC ..... *G01N 21/4795* (2013.01); *G01N 21/1717* (2013.01); *G01N 21/6458* (2013.01)

(58) Field of Classification Search
CPC ........... G01N 21/4795; G01N 21/1717; G01N 21/6458; G01N 21/6456; G02B 21/367;
(Continued)

(56) References Cited

U.S. PATENT DOCUMENTS

2007/0024869 A1    2/2007  Ostrovsky et al.
2012/0182558 A1*   7/2012  Masumura .......... A61B 5/0068
                                              356/450
(Continued)

FOREIGN PATENT DOCUMENTS

CN    107144955 A      9/2017
DE    102014119255 A1  6/2016
(Continued)

OTHER PUBLICATIONS

Isobe, Keisuke, et al. "Enhancement of lateral resolution and optical sectioning capability of two-photon fluorescence microscopy by combining temporal-focusing with structured illumination." Biomedical optics express 4.11 (2013): 2396-2410. (Year: 2013).*
(Continued)

*Primary Examiner* — Dominic J Bologna
(74) *Attorney, Agent, or Firm* — Womble Bond Dickinson (US) LLP

(57) ABSTRACT

A method and system are disclosed for use in imaging a sample. The method comprises illuminating a sample through a scattering medium, or illuminating a sub-surface region of the sample through a scattering surface region of the sample, with a plurality of spatial patterns of incident electromagnetic radiation, wherein each spatial pattern of incident electromagnetic radiation interacts with the sample, or the sub-surface region of the sample, to generate electromagnetic radiation in the sample or the sub-surface region of the sample. The method comprises measuring, for each spatial pattern of incident electromagnetic radiation, a corresponding value representative of a quantity of at least a portion of the emitted electromagnetic radiation and using the plurality of spatial patterns of incident electromagnetic radiation and the plurality of corresponding measured values to determine an image of the sample, or an image of the
(Continued)

sub-surface region of the sample, without using a spatial distribution of the emitted electromagnetic radiation.

24 Claims, 20 Drawing Sheets

(58) Field of Classification Search
CPC .......... G02B 21/0032; G02B 21/0076; G02B 21/008; G02B 21/16
See application file for complete search history.

(56) References Cited

U.S. PATENT DOCUMENTS

| 2013/0094755 | A1 | 4/2013 | Lippert et al. |
| 2014/0128743 | A1 | 5/2014 | Yew et al. |
| 2016/0338592 | A1* | 11/2016 | Masumura ......... G01N 21/4795 |

FOREIGN PATENT DOCUMENTS

| EP | 3096129 A1 | 11/2016 |
| WO | 2008/144434 A1 | 11/2008 |
| WO | 2012/050901 A2 | 4/2012 |
| WO | 2012/080838 A2 | 6/2012 |
| WO | 2013072875 A2 | 5/2013 |
| WO | 2018081711 A1 | 5/2018 |

OTHER PUBLICATIONS

Cheng, Li-Chung, et al. "Nonlinear structured-illumination enhanced temporal focusing multiphoton excitation microscopy with a digital micromirror device." Biomedical optics express 5.8 (2014): 2526-2536. (Year: 2014).*

Tai, E., Oron, D. Silberberg, Y. "Improved depth resolution in video-rate line-scanning multiphoton microscopy using temporal focusing", Opt. Letters, 30, 1686-1688 (2005).

Papagiakoumou, E. et al "Functional patterned multiphoton excitation deep inside scattering tissue", Nature Photonics 7, 274-278 (2013).

Dana, H. & Shoham, S. "Numerical evaluation of temporal focusing characteristics in transparent and scattering media", Opt. Express 19, 4937-4948 (2011).

D. Oron, E. Tai, Y. Silberberg, Scanningless depth-resolved microscopy. Opt. Express 13, 1468-1475 (2005).

G. Zhu, J. van Howe, M. Durst, W. Zipfel, C. Xu, Simultaneous spatial and temporal focusing of femtosecond pulses. Opt. Express 13, 2153-2159 (2005).

N. G. Horton, K. Wang, D. Kobat, C. G. Clark, F. W. Wise, C. B. Schaffer, C. Xu, In vivo three-photon microscopy of subcortical structures within an intact mouse brain. Nat. Photonics 7, 205-209 (2013).

Keisuke Isobe et al: "Enhancement of lateral resolution and optical sectioning capability of two-photon fluorescence microscopy by combining temporal-focusing with structured illumination", Biomedical Optics Express, vol. 4, No. 11, Oct. 10, 2013 p. 2396.

Li-Chung Cheng et al: "Nonlinear structured-illumination enhanced temporal focusing multiphoton excitation microscopy with a digtal micromirror device", Biomedical Optics Express, vol. 5, No. 8, Jul. 8, 2014, p. 2526.

O.D. Therrien et al: "Wide-field multiphoton imaging of cellular dynamics in thick tissue by temporal focusing and patterned illumination", Biomedical Optics Express, vol. 2, No. 3, Mar. 1, 2011, p. 696.

Keisuke Isobe et al: "Temporal focusing microscopy combined with three-dimensional structured illumination", Japanese Journal of Applied Physics, vol. 56, No. 5, Mar. 31, 2017, p. 052501.

Yunlong Meng et al: "Fast two-snapshot structured illumination for temporal focusing microscopy with enhanced axial resolution", Optics Express, vol. 25, No. 19, Sep. 18, 2017.

National Nanotechnology Infrastructure Network Research Experience for Undergraduates (NNIN REU) Program 2015 Nathan Brooks, "Image reconstruction through scattering media using a single-pixel camera", pp. 130-131.

Optics Express, vol. 23 No. 11, May 22, 2015, V. Duran et al, "Compressive imaging in scattering media", pp. 14424-14433, see the abstract, figures 1a,b and section 2 especially.

Eirini Papagiakoumou et al: 'Patterned two-photon illumination by spatiotemporal shaping of ultrashort pulses'. Optics Express, vol. 16 No. 26, Dec. 22, 2008, p. 22,039.

Ziwei Li et al: 'Contrast and resolution enhanced optical sectioning in scattering tissue using line-scanning two-photon structured illumination microscopy'. Optics Express, vol. 25 No. 25, Dec. 1, 2017 p. 32,010.

Adam Straub et al: 'High speed multiphoton axial scanning through an optical fiber in a remotely scanned temporal focusing setup.' Biomedical Optics Express, vol. 2 No. 1, Oct. 1, 2011 p. 80.

International Search Report in Application No. GB1715385.9 dated May 14, 2019.

International Search Report in Application No. PCT/GB2019/052613, dated Dec. 12, 2019.

International Search Report in Application No. GB1816606.6 dated Apr. 12, 2019.

International Search Report in Application No. GB1715385.9 dated Feb. 27, 2018.

International Search Report in Application No. PCT/GB2018052684 dated Jan. 2, 2019.

* cited by examiner

Temporal Focusing

No Temporal Focusing

IMAGING OF A SAMPLE THROUGH A SCATTERING MEDIUM

FIELD

The present disclosure relates to a method and a system for use in imaging of a sample through a scattering medium, or for use in imaging a sub-surface region of a sample through a scattering surface region of the sample, and, in particular though not exclusively, for use in wide-field microscopy of a sample through a scattering medium, or a sub-surface region of a sample through a scattering surface region of the sample, in an epi-detection configuration without any aberration correction and/or without any requirement to determine a priori any information about the scattering medium or the scattering surface region of the sample.

BACKGROUND

The confocal microscope has dominated imaging for several decades marking a step change in the way image formation is created, typically by point scanning. The emergence of multi-photon fluorescence imaging has added immense value to the field as the non-linear dependence of the sample signal on the input peak intensity has restricted information solely to the focal volume. However confocal and multi-photon fluorescence imaging in this form requires scanning of the excitation field and thus has an inherent limitation of speed of image acquisition which can be a roadblock for fast dynamics.

In tandem with the requirement for rapidly acquiring a wide-field image, a challenge for all imaging is to deliver a field and recover a signal through a scattering or turbid medium such as tissue.

SUMMARY

It should be understood that any one or more of the features of any of the following aspects or embodiments may be combined with any one or more of the features of any of the other aspects or embodiments.

According to at least one aspect or to at least one embodiment there is provided a method for use in imaging a sample through a scattering medium, or for use in imaging a sub-surface region of a sample through a scattering surface region of the sample, the method comprising:

illuminating the sample through the scattering medium, or illuminating the sub-surface region of the sample through the scattering surface region of the sample, with a plurality of spatial patterns of incident electromagnetic radiation, wherein each spatial pattern of incident electromagnetic radiation interacts with the sample, or the sub-surface region of the sample, to generate electromagnetic radiation in the sample or the sub-surface region of the sample;

measuring, for each spatial pattern of incident electromagnetic radiation, a corresponding value representative of a quantity of at least a portion of the emitted electromagnetic radiation; and using the plurality of spatial patterns of incident electromagnetic radiation and the plurality of corresponding measured values to determine an image of the sample, or an image of the sub-surface region of the sample, without using a spatial distribution of the emitted electromagnetic radiation.

Such a method may allow imaging of a sample through a scattering medium, or imaging of a sub-surface region of a sample through a scattering surface region of the sample, without any aberration correction, without any a priori knowledge of the scattering medium or scattering surface region of the sample, and without any requirement to determine a priori any information about the scattering medium or the scattering surface region of the sample. Such a method may allow imaging of a sample through a scattering medium, or imaging of a sub-surface region of a sample through a scattering surface region of the sample, without reference to the spatial origin of the emitted electromagnetic radiation.

The plurality of spatial patterns of incident electromagnetic radiation may comprise a set of mutually complementary spatial radiation patterns. The plurality of spatial patterns of incident electromagnetic radiation may comprise a set of pairs of inverse spatial radiation patterns.

The plurality of spatial patterns of incident electromagnetic radiation may comprise an orthonormal basis set of spatial radiation patterns.

The plurality of spatial patterns of incident electromagnetic radiation may comprise a full orthonormal basis set of spatial radiation patterns.

The plurality of spatial patterns of incident electromagnetic radiation may comprise a subset of a full orthonormal basis set of spatial radiation patterns.

Use of a subset of a full orthonormal basis set of spatial radiation patterns may allow compressive imaging techniques to be employed and may, therefore, reduce measurement times and/or reduce the volume of measurement data compared with the use of a full orthonormal basis set of spatial radiation patterns.

The plurality of spatial patterns of incident electromagnetic radiation may comprise a plurality of binary spatial radiation patterns.

The plurality of spatial patterns of incident electromagnetic radiation may comprise a set of Hadamard radiation patterns.

The plurality of spatial patterns of incident electromagnetic radiation may comprise Hermite-Gaussian modes, Laguerre-Gaussian modes, Bessel modes or eigenmodes such as optical eigenmodes.

The plurality of spatial patterns of first electromagnetic radiation may comprise a plurality of greyscale spatial radiation patterns.

The plurality of spatial patterns of incident electromagnetic radiation may comprise a plurality of sinusoidal spatial radiation patterns, wherein each sinusoidal spatial radiation pattern has a different spatial frequency. The plurality of spatial patterns of incident electromagnetic radiation may comprise a plurality of harmonic sinusoidal spatial radiation patterns. The number of sinusoidal spatial radiation patterns may be equal to a number of pixels required in the final image to be constructed.

The plurality of spatial patterns of incident electromagnetic radiation may comprise a number N of phase-shifting sinusoidal radiation patterns for each spatial frequency, wherein each phase-shifting sinusoidal radiation pattern has a phase shift of $2\pi/N$ relative to an adjacent one of the phase-shifting sinusoidal radiation patterns. The plurality of spatial patterns of incident electromagnetic radiation may comprise four phase-shifting sinusoidal radiation patterns for each spatial frequency, wherein each phase-shifting sinusoidal radiation pattern has a phase shift of $\pi/2$ relative to an adjacent one of the phase-shifting sinusoidal radiation patterns.

The plurality of spatial patterns of incident electromagnetic radiation may be selected or configured for imaging beyond the diffraction limit or for super-resolution imaging.

Using the plurality of spatial patterns of incident electromagnetic radiation and the plurality of corresponding measured values to determine the image of the sample or the image of the sub-surface region of the sample may comprise using an image construction algorithm to construct the image of the sample or the sub-surface region of the sample from the plurality of spatial patters of incident electromagnetic radiation and the plurality of corresponding measured values.

Using the plurality of spatial patterns of incident electromagnetic radiation and the plurality of corresponding measured values to determine the image of the sample or the image of the sub-surface region of the sample may comprise using an orthogonal matching pursuit algorithm to construct the image of the sample or the sub-surface region of the sample from the plurality of spatial patterns of incident electromagnetic radiation and the plurality of corresponding measured values.

Using the plurality of spatial patterns of incident electromagnetic radiation and the plurality of corresponding measured values to determine the image of the sample or the image of the sub-surface region of the sample may comprise using a conventional single-pixel imaging (SPI) algorithm such as a differential ghost imaging method, a gradient descent method, an alternating projection method, a sparse representation method, a total variation regularization method, a conjugate gradient descent method, a Poisson maximum likelihood method, or a Fourier spectrum acquisition method.

Using the plurality of spatial patterns of incident electromagnetic radiation and the plurality of corresponding measured values to determine the image of the sample or the image of the sub-surface region of the sample may comprise constructing the image of the sample or the image of the sub-surface region of the sample from the plurality of corresponding measured values using a compressive sensing algorithm e.g. using an algorithm equivalent to an algorithm used for JPEG image compression. For compressive sensing, the method may use a range of algorithms. These can be classified into three categories according to the type of iteration they use. Examples are: (i) non-iterative methods; (ii) linear iterative methods; and (iii) non-linear iterative methods. The non-iterative methods are the fastest but require the most measurements. The non-linear iterative methods need the fewest measurements but take longer.

Using the plurality of spatial patterns of incident electromagnetic radiation and the plurality of corresponding measured values to determine the image of the sample or the image of the sub-surface region of the sample may comprise determining an inverse Fourier transform of the plurality of measured values.

The method may comprise using the plurality of spatial patterns of incident electromagnetic radiation and the plurality of corresponding measured values to determine the image of the sample or the image of the sub-surface region of the sample without measuring a spatial distribution of the emitted electromagnetic radiation.

The method may comprise using the plurality of spatial patterns of incident electromagnetic radiation and the plurality of corresponding measured values to determine the image of the sample or the image of the sub-surface region of the sample without recording a spatial distribution of the emitted electromagnetic radiation.

Measuring, for each spatial pattern of incident electromagnetic radiation, the corresponding value representative of a quantity of at least a portion of the emitted electromagnetic radiation may comprise using single pixel detection.

Measuring, for each spatial pattern of incident electromagnetic radiation, the corresponding value representative of a quantity of at least a portion of the emitted electromagnetic radiation may comprise using a single pixel detector to measure the power or the intensity of the emitted electromagnetic radiation which is incident on the single pixel detector. Using a single pixel detector may provide a higher sensitivity and/or a greater dynamic range than using a multi-pixel detector.

The method may comprise a Ghost Imaging method. The method may comprise illuminating the sample through the scattering medium or illuminating the sub-surface region of the sample through the scattering surface region of the sample using classical light. The method may comprise illuminating the sample through the scattering medium or illuminating the sub-surface region of the sample through the scattering surface region of the sample using one or more sources of light obeying non-classical (quantum) statistics.

Measuring, for each spatial pattern of incident electromagnetic radiation, the corresponding value representative of a quantity of at least a portion of the emitted electromagnetic radiation may comprise measuring, for each spatial pattern of incident electromagnetic radiation, the power or the intensity of the emitted electromagnetic radiation incident on a single pixel of a multi-pixel detector such as an image sensor, or spatially integrating the power or the intensity of the emitted electromagnetic radiation incident on a plurality of the pixels of the multi-pixel detector.

The method may comprise sequentially illuminating the sample through the scattering medium or sequentially illuminating the sub-surface region of the sample through the scattering surface region of the sample with the plurality of spatial patterns of incident electromagnetic radiation.

The method may comprise:

illuminating one side of the sample through the scattering medium or one side of the sub-surface region of the sample through the scattering surface region of the sample; and measuring the value representative of a quantity at least a portion of the emitted electromagnetic radiation emitted from the same side of the sample through the same scattering medium or emitted from the same side of the sub-surface region of the sample through the same scattering surface region of the sample.

Such a method may allow imaging in an epi-detection configuration. Such a method may be particularly useful for microscopy.

The method may comprise:

illuminating one side of the sample through the scattering medium or one side of the sub-surface region of the sample through the scattering surface region of the sample; and measuring the value representative of a quantity at least a portion of the emitted electromagnetic radiation emitted from a different, for example an opposite, side of the sample or emitted from a different, for example an opposite, side of the sub-surface region of the sample.

Such a method may allow imaging in a transmission configuration.

The method may comprise:

using a lens to illuminate the sample or the sub-surface region of the sample; and using the same lens to collect at least a portion of the emitted electromagnetic radiation.

Such a method may allow imaging in an epi-detection configuration.

The method may comprise:
using a lens to illuminate the sample or the sub-surface region of the sample; and
using a different lens to collect at least a portion of the emitted electromagnetic radiation.

Such a method may allow imaging in a transmission configuration.

The method may comprise focusing each spatial pattern of incident electromagnetic radiation to a focal plane or focal volume.

The method may comprise using temporal focusing to focus each spatial pattern of incident electromagnetic radiation to the focal plane or focal volume. Using temporal focusing may facilitate wide-field imaging without any requirement to scan the illumination. Using temporal focusing may also increase the robustness of the method of imaging to scattering.

The incident electromagnetic radiation may comprise a range of different wavelengths. The method may comprise dispersing the different wavelengths in the range of different wavelengths along different paths and focusing the different wavelengths to the focal plane or focal volume.

According to at least one aspect or to at least one embodiment there is provided an imaging system for use in imaging a sample through a scattering medium, or for use in imaging a sub-surface region of a sample through a scattering surface region of the sample, the system comprising:
an illumination arrangement for illuminating the sample through the scattering medium, or illuminating the sub-surface region of the sample through the scattering surface region of the sample, with a plurality of spatial patterns of incident electromagnetic radiation, wherein each spatial pattern of incident electromagnetic radiation interacts with the sample, or the sub-surface region of the sample, to generate electromagnetic radiation in the sample or the sub-surface region of the sample;
a detection arrangement for measuring, for each spatial pattern of incident electromagnetic radiation, a corresponding value representative of a quantity of at least a portion of the emitted electromagnetic radiation; and
a processing resource configured to use the plurality of spatial patterns of incident electromagnetic radiation and the plurality of corresponding measured values to determine an image of the sample, or an image of the sub-surface region of the sample, without using a spatial distribution of the emitted electromagnetic radiation.

The plurality of spatial patterns of incident electromagnetic radiation may comprise a set of mutually complementary spatial radiation patterns. The plurality of spatial patterns of incident electromagnetic radiation may comprise a set of pairs of inverse spatial radiation patterns.

The plurality of spatial patterns of incident electromagnetic radiation may comprise an orthonormal basis set of spatial radiation patterns. The plurality of spatial patterns of incident electromagnetic radiation may comprise a full orthonormal basis set of spatial radiation patterns.

The plurality of spatial patterns of incident electromagnetic radiation may comprise a subset of a full orthonormal basis set of spatial radiation patterns.

The plurality of spatial patterns of incident electromagnetic radiation may comprise a plurality of binary spatial radiation patterns.

The plurality of spatial patterns of incident electromagnetic radiation may comprise a full set of Hadamard radiation patterns.

The plurality of spatial patterns of incident electromagnetic radiation may comprise Hermite-Gaussian modes, Laguerre-Gaussian modes, Bessel modes or eigenmodes such as optical eigenmodes.

The plurality of spatial patterns of first electromagnetic radiation may comprise a plurality of greyscale spatial radiation patterns.

The plurality of spatial patterns of incident electromagnetic radiation may comprise a plurality of sinusoidal spatial radiation patterns, wherein each sinusoidal spatial radiation pattern has a different spatial frequency. The plurality of spatial patterns of incident electromagnetic radiation may comprise a plurality of harmonic sinusoidal spatial radiation patterns. The number of sinusoidal spatial radiation patterns may be equal to a number of pixels required in the final image of the sample or the final image of the sub-surface region of the sample to be constructed.

The plurality of spatial patterns of incident electromagnetic radiation may comprise a plurality of phase-shifting sinusoidal spatial radiation patterns. The plurality of spatial patterns of incident electromagnetic radiation may comprise a number N of phase-shifting sinusoidal radiation patterns for each spatial frequency, wherein each phase-shifting sinusoidal radiation pattern has a phase shift of $2n/N$ relative to an adjacent one of the phase-shifting sinusoidal radiation patterns. The plurality of spatial patterns of incident electromagnetic radiation may comprise four phase-shifting sinusoidal radiation patterns for each spatial frequency, wherein each phase-shifting sinusoidal radiation pattern has a phase shift of $\pi/2$ relative to an adjacent one of the phase-shifting sinusoidal radiation patterns.

The plurality of spatial patterns of incident electromagnetic radiation may be selected or configured for imaging beyond the diffraction limit or for super-resolution imaging.

The imaging system may comprise a controller for controlling the illumination arrangement so as to illuminate the sample through the scattering medium or the sub-surface region of the sample through the scattering surface region of the sample with the plurality of spatial patterns of incident electromagnetic radiation.

The controller may comprise the processing resource.

The processing resource may be configured to use an image construction algorithm to construct the image of the sample or the sub-surface region of the sample from the plurality of spatial patterns of incident electromagnetic radiation and the plurality of corresponding measured values.

The processing resource may be configured to use an orthogonal matching pursuit algorithm to construct the image of the sample or the sub-surface region of the sample from the plurality of spatial patterns of incident electromagnetic radiation and the plurality of corresponding measured values.

The processing resource may be configured to determine the image of the sample or the image of the sub-surface region of the sample by constructing the image using a conventional single-pixel imaging (SPI) algorithm such as a differential ghost imaging method, a gradient descent method, an alternating projection method, a sparse representation method, a total variation regularization method, a conjugate gradient descent method, a Poisson maximum likelihood method, and a Fourier spectrum acquisition method.

The processing resource may be configured to construct the image of the sample or the image of the sub-surface region of the sample from the plurality of spatial patterns of incident electromagnetic radiation and the plurality of corresponding measured values using a compressive sensing algorithm e.g. through an algorithm equivalent to an algorithm used for JPEG image compression.

For compressive sensing, the processing resource may be configured to construct the image of the sample or the image of the sub-surface region of the sample from the plurality of spatial patterns of incident electromagnetic radiation and the plurality of corresponding measured values using a range of algorithms. These can be classified into three categories according to the type of iteration they use. Examples are: (i) non-iterative methods; (ii) linear iterative methods; and (iii) non-linear iterative methods. The non-iterative methods are the fastest but require the most measurements. The non-linear iterative methods need the fewest measurements but take longer.

The processing resource may be configured to construct the image of the sample or the image of the sub-surface region of the sample from the plurality of spatial patterns of incident electromagnetic radiation and the plurality of corresponding measured values by determining an inverse Fourier transform of the corresponding measured values.

The processing resource may be configured to control the illumination arrangement so as to illuminate the sample through the scattering medium or the sub-surface region of the sample through the scattering surface region of the sample according to a Ghost Imaging method. The controller may be configured to control the illumination arrangement so as to illuminate the sample or the sub-surface region of the sample using classical light. The controller may be configured to control the illumination arrangement so as to illuminate the sample or the sub-surface region of the sample using one or more sources of light obeying non-classical (quantum) statistics.

The processing resource may be configured to use the plurality of spatial patterns of incident electromagnetic radiation and the plurality of corresponding measured values to determine the image of the sample or the image of the sub-surface region of the sample without the detection arrangement measuring a spatial distribution of the emitted electromagnetic radiation.

The processing resource may be configured to use the plurality of spatial patterns of incident electromagnetic radiation and the plurality of corresponding measured values to determine the image of the sample or the image of the sub-surface region of the sample without recording a spatial distribution of the emitted electromagnetic radiation.

The detection arrangement may comprise a single pixel detection arrangement.

The detection arrangement may comprise a single pixel detector for measuring the power or intensity of the emitted electromagnetic radiation incident on the single pixel detector.

The detection arrangement may comprise a photodiode or a photo-multiplier tube (PMT).

The detection arrangement may comprise a single pixel of a multi-pixel detector such as an image sensor.

The detection arrangement may comprise a multi-pixel detector such as an image sensor which is configured to spatially integrate the power or intensity of the emitted electromagnetic radiation incident on a plurality of the pixels of the multi-pixel detector.

The illumination arrangement may be configured to sequentially illuminate the sample through the scattering medium or to sequentially illuminate the sub-surface region of the sample through the scattering surface region of the sample with the plurality of spatial patterns of incident electromagnetic radiation.

The illumination arrangement may comprise a spatial modulation arrangement for imposing each spatial pattern onto a beam of incident electromagnetic radiation so as to provide the corresponding spatial pattern of incident electromagnetic radiation.

The spatial modulation arrangement may comprise a diffractive spatial modulation arrangement.

The spatial modulation arrangement may comprise a spatial light modulator or a digital micro-mirror device.

The illumination arrangement may be configured to focus each spatial pattern of incident electromagnetic radiation to a focal plane or volume.

The illumination arrangement may be configured to use temporal focusing to focus each spatial pattern of incident electromagnetic radiation to the focal plane or volume.

The illumination arrangement may be configured to provide the incident electromagnetic radiation with a range of different wavelengths.

The illumination arrangement may be configured to disperse the different wavelengths in the range of different wavelengths along different paths.

The illumination arrangement may be configured to focus the different wavelengths to the focal plane or volume.

The illumination arrangement may comprise a dispersive element such as a diffraction grating for dispersing the different wavelengths in the range of different wavelengths along the different paths.

The illumination arrangement may comprise a source for emitting the beam of incident electromagnetic radiation.

The source may be coherent.

The source may comprise a laser and/or an optical parametric oscillator (OPO).

The source may be tuneable.

The illumination arrangement may be configured to illuminate one side of the sample through the scattering medium or one side of the sub-surface region of the sample through the scattering surface region of the sample, and wherein the detection arrangement may be configured to measure the value representative of the quantity of at least a portion of the emitted electromagnetic emitted from the same side of the sample through the same scattering medium or emitted from the same side of the sub-surface region of the sample through the same scattering surface region of the sample.

The imaging system may comprise a lens for illuminating the sample or the sub-surface region of the sample and for collecting at least a portion of the emitted electromagnetic radiation.

The lens may be configured to illuminate the sample or the sub-surface region of the sample and the same lens may be configured to collect at least a portion of the emitted electromagnetic radiation emitted from the sample through the same scattering medium or emitted from the sub-surface region of the sample through the same scattering surface region of the sample.

The lens may comprise an objective lens such as a microscope objective.

The imaging system may be configured for microscopy.

The imaging system may be configured for use with a microscope.

The imaging system may comprise a microscope.

According to at least one aspect or to at least one embodiment there is provided a method for use in imaging a sample through a scattering medium, the method comprising:

illuminating the sample through the scattering medium with a plurality of spatial patterns of incident electromagnetic radiation; and measuring, for each spatial pattern of incident electromagnetic radiation, emitted electromagnetic radiation generated by the sample as a result of an interaction of the incident electromagnetic radiation with the sample.

According to at least one aspect or to at least one embodiment there is provided an imaging system for use in imaging a sample through a scattering medium, the system comprising:

an illumination arrangement for illuminating the sample through the scattering medium with a plurality of spatial patterns of incident electromagnetic radiation; and a detection arrangement for measuring, for each spatial pattern of incident electromagnetic radiation, emitted electromagnetic radiation generated by the sample as a result of an interaction of the incident electromagnetic radiation with the sample.

The sample or the sub-surface region of the sample may be fluorescent.

The sample or the sub-surface region of the sample may comprise one or more exogenous fluorophores such as a green fluorescent protein (GFP) or a red fluorescent protein (RFP).

The sample or the sub-surface region of the sample may comprise one or more endogenous fluorophores such as NADH and/or flavins.

The scattering medium may be fluorescent.

The scattering surface region of the sample may be fluorescent.

The sample or the sub-surface region of the sample may scatter the incident electromagnetic radiation and/or the emitted electromagnetic radiation generated by the sample or the sub-surface region of the sample.

One or both of the sample and the scattering medium may comprise biological material.

One or both of the sub-surface region and the scattering surface region of the sample may comprise biological material.

One or both of the sample and the scattering medium may comprise human or animal tissue.

One or both of the sub-surface region and the scattering surface region of the sample may comprise human or animal tissue.

The incident electromagnetic radiation and the emitted electromagnetic radiation may have different spectra.

The incident electromagnetic radiation and the emitted electromagnetic radiation may have one or more different wavelengths.

The incident electromagnetic radiation may comprise light, for example infrared, visible or UV light.

The emitted electromagnetic radiation may comprise light, for example infrared, visible or UV light.

The emitted electromagnetic radiation may comprise THz radiation.

The emitted electromagnetic radiation may comprise fluorescence generated by the sample or the sub-surface region of the sample as a result of excitation of the sample or the sub-surface region of the sample by the incident electromagnetic radiation.

The incident electromagnetic radiation may be configured for two-photon excitation of the sample or the sub-surface region of the sample. For example, the incident electromagnetic radiation may include an appropriate wavelength or range of wavelengths for two-photon excitation of the sample or the sub-surface region of the sample.

The electromagnetic radiation may comprise one or more wavelengths in the range 680 nm to 1080 nm.

The electromagnetic radiation may comprise a wavelength of 750-850 nm.

The electromagnetic radiation may comprise a wavelength of approximately 800 nm.

The incident electromagnetic radiation may be configured for three-photon excitation of the sample or the sub-surface region of the sample. For example, the incident electromagnetic radiation may include an appropriate wavelength or range of wavelengths for three-photon excitation of the sample or the sub-surface region of the sample.

The electromagnetic radiation may comprise one or more wavelengths in the range 700 nm to 1800 nm.

The electromagnetic radiation may comprise one or more wavelengths which are:

between 1030 nm and 1050 nm, for example at or around 1040 nm;

between 1540 nm and 1560 nm, for example at or around 1550 nm; and/or between 1665 nm and 1685 nm, for example at or around 1675 nm.

The emitted electromagnetic radiation may be generated by the sample or the sub-surface region of the sample as a result of a non-linear optical interaction between the incident electromagnetic radiation and the sample or the sub-surface region of the sample.

The emitted electromagnetic radiation may comprise a harmonic of the incident electromagnetic radiation. For example, the emitted electromagnetic radiation may comprise the second harmonic of the incident electromagnetic radiation or a third harmonic of the incident electromagnetic radiation.

The emitted electromagnetic radiation may be generated as a result of inelastic scattering by the sample or the sub-surface region of the sample.

The emitted electromagnetic radiation may be generated as a result of Raman scattering by the sample or the sub-surface region of the sample.

The emitted electromagnetic radiation may be generated as a result of coherent or stimulated Raman scattering by the sample or the sub-surface region of the sample.

The emitted electromagnetic radiation may be generated as a result of Coherent Anti-Stokes Raman Scattering (CARS) by the sample or the sub-surface region of the sample.

The incident electromagnetic radiation may comprise a stream of pulses of electromagnetic radiation.

Each pulse of incident electromagnetic radiation may have a duration of 1 ps or less, 500 fs or less, 100-200 fs, or 10-100 fs.

The incident electromagnetic radiation may have an average power in the range 100-500 mW, 10 mW-100 mW or 1 mW-10 mW.

The value representative of the quantity of at least a portion of the emitted electromagnetic radiation may comprise a power or intensity value of at least a portion of the emitted electromagnetic radiation such as a relative or absolute power or intensity value of at least a portion of the emitted electromagnetic radiation.

The sub-surface region of the sample may comprise an extended region of the sample, for example a 2D region of the sample such as a plane, or a 3D region of the sample.

BRIEF DESCRIPTION OF THE DRAWINGS

A method and a system for use in multi-photon imaging of a fluorescent sample through a scattering medium will now be described by way of non-limiting example only with reference to the drawings of which.

DETAILED DESCRIPTION OF THE DRAWINGS

Figure 1:
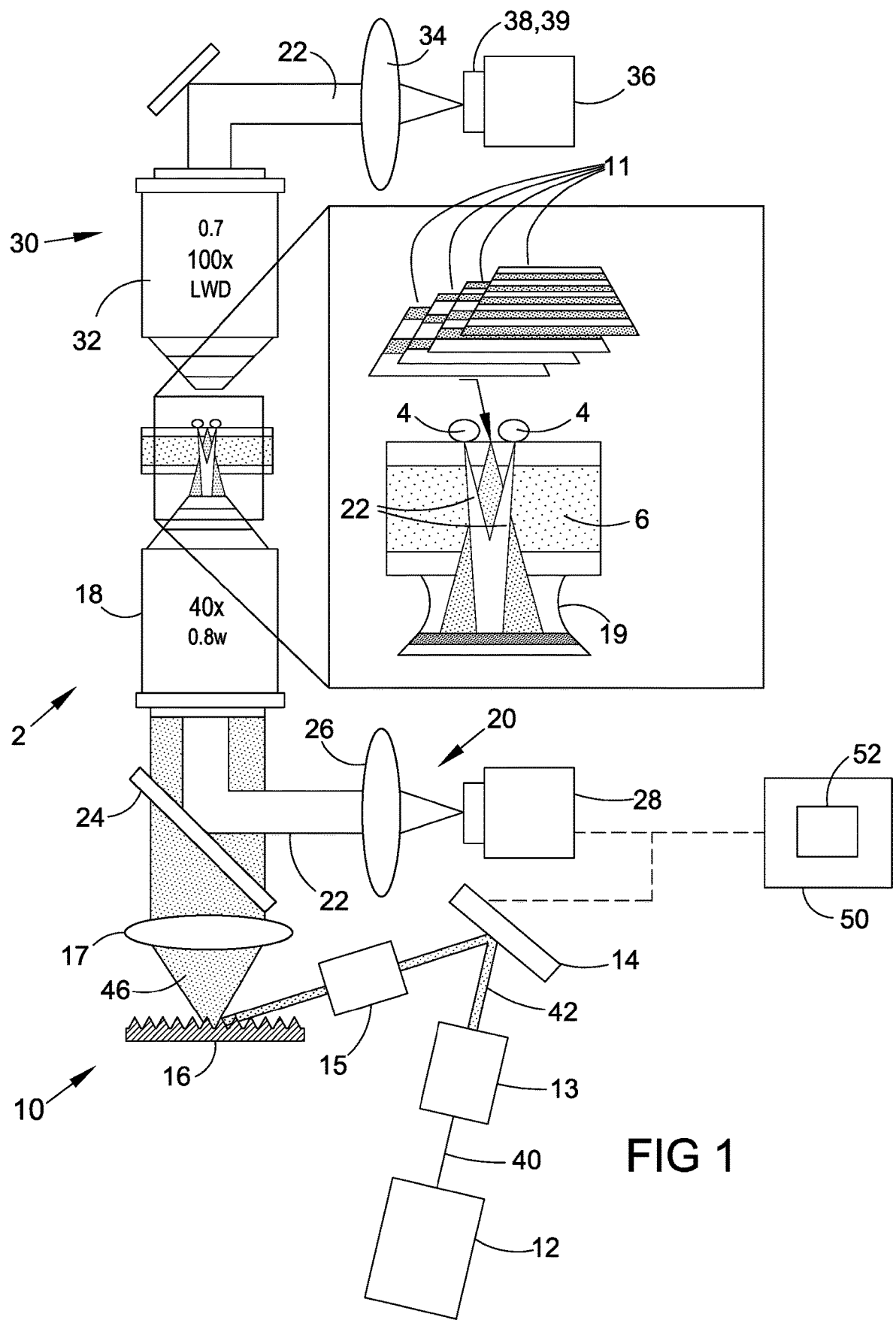
FIG. 1 shows a multi-photon imaging system and a reference transmission imaging system.

Referring initially to FIG. 1 there is shown an imaging system generally designated 2 for use in multi-photon fluorescence excitation microscopy of a fluorescent sample 4 through a scattering medium 6.

The imaging system 2 includes an illumination arrangement generally designated 10 for illuminating the fluorescent sample 4 through the scattering medium 6 with a plurality of spatial patterns 11 of incident electromagnetic radiation for the multi-photon excitation of the fluorescent sample 4. The plurality of spatial patterns 11 comprises an orthonormal basis set in the form of a set of Hadamard radiation patterns.

The imaging system 2 further includes a detection arrangement generally designated 20 for measuring, for each spatial pattern 11 of incident electromagnetic radiation, emitted electromagnetic radiation in the form of fluorescence 22 generated by the fluorescent sample 4 as a result of the multi-photon excitation of the fluorescent sample 4.

As will be appreciated by one of ordinary skill in the art, the imaging system 2 is arranged in an epi-fluorescence configuration wherein the illumination arrangement 10 is configured to illuminate one side of the fluorescent sample 4 (i.e. the underside of the fluorescent sample 4 in FIG. 1) through the scattering medium 6 and the detection arrangement 20 is configured to measure fluorescence 22 which is generated in the fluorescent sample 4 and emitted from same side of the fluorescent sample 4 (i.e. the underside of the fluorescent sample 4 in FIG. 1) through the scattering medium 6.

As shown in FIG. 1, the illumination arrangement 10 includes a source of incident electromagnetic radiation in the form of a laser 12 (Coherent Chameleon Ultra II), a beam expansion arrangement 13, a spatial light modulator ((Hamamatsu LCOS-SLM) 14, an optional 4f (f=400 mm) telescope 15 and a blazed reflective diffraction grating (1200 g/mm) 16. The illumination arrangement 10 further includes a collimating lens 17 (f=400 mm) and an illumination objective 18 (40× Nikon NA=0.8 water dipping objective). The diffraction grating 16 lies in the back focal plane of the collimating lens 17, the fluorescent sample 4 lies in the front focal plane of the illumination objective 18, and the collimating lens 17 and the illumination objective 18 are separated by a distance equal to the sum of their respective focal lengths so that the arrangement of the diffraction grating 16, the collimating lens 17, the illumination objective 18 and the fluorescent sample 4 is equivalent to a 4f configuration. The fluorescent sample 4, the scattering medium 6 and the end of the illumination objective 18 adjacent to the scattering medium 6 are enclosed in a custom-made chamber (not shown) filled with water 19.

The detection arrangement 20 includes the same objective 18 used for illumination of the fluorescent sample 4, a dichroic mirror 24, a focusing lens 26, and an image sensor in the form of an electron multiplying CCD (EMCCD) camera (Andor iXon 885) 28. The EMCCD camera 28 is configured to operate as a bucket or a single pixel detector e.g. using 64×64 binning.

The imaging system 2 further includes a controller 50 which includes a processing resource 52. As illustrated by the dashed lines in FIG. 1, the controller 50 is configured for communication with the SLM 14 and the EMCCD camera 28. Specifically, the controller 50 is configured to receive a signal from the EMCCD camera 28 which is representative of the total fluorescence 22 detected by the EMCCD camera 28 for each spatial pattern 11 of incident electromagnetic radiation used to illuminate the fluorescent sample 4. The controller 50 is also configured to control the SLM 14 so as to generate the spatial patterns 11 of incident electromagnetic radiation in a focal plane or volume of the illumination objective 18.

Also shown in FIG. 1 is a reference transmission imaging system generally designated 30. One of ordinary skill in the art will understand that the reference transmission imaging system 30 does not form part of the imaging system 2. Nor is the reference transmission imaging system 30 required to provide an image of the fluorescent sample 4. Instead, the reference transmission imaging system 30 is used only for verifying the operation of the imaging system 2 as will be described in more detail below. The reference transmission imaging system 30 includes a long working distance 100× Mitutoyo NA=0.7 air objective 32 for collecting fluorescence 22 generated in the fluorescent sample 4 and emitted from the side of the fluorescent sample 4 opposite to the illuminated side of the fluorescent sample 4 (i.e. emitted from the upper side of the fluorescent sample 4 in FIG. 1), a focusing lens 34, and a CCD camera (Andor Clara) 36.

The reference transmission imaging system 30 includes one or more short pass filters 38 for rejecting excitation light at the wavelength of the laser 12 and for transmitting fluorescence below 700 nm. The reference transmission imaging system 30 also includes an iris 39 for minimising an auto-fluorescence signal emerging from biological samples. The iris 39 effectively acts as a "confocal-type" arrangement to help limit out-of-focus light. One of ordinary skill in the art will understand that although the one or more short pass filters 38 and the iris 39 are shown in FIG. 1 mounted at front of the CCD camera 36, the one or more short pass filters 38 and the iris 39 may be located anywhere between the air objective 32 and the CCD camera 36.

One of ordinary skill in the art will also understand that the objectives 18, 32, the sample 4, the scattering medium 6 and the CCD cameras 28, 36 may be mounted on the body of a microscope of any kind (e.g. an inverted commercial microscope such as a NIKON Eclipse Ti-S).

In use, the laser 12 delivers a laser beam 40 of optical pulses, each pulse having a duration of less than 1 ps, for example 100-200 fs or 140 fs, at a variable central wavelength between 680 nm and 1080 nm. The centre wavelength selected depends upon the field of use. For biomedical imaging, the centre wavelength may be selected so as to fall within the therapeutic window (i.e. typically from around 700 nm-1100 nm) to avoid damage to the sample 4. The beam expansion arrangement 13 expands the laser beam 40 by a factor of four to provide an expanded beam 42 which covers an active area of the SLM 14. The 4f telescope 15 images the SLM 14 onto the grating 16. The first diffraction order from the SLM 14 is transmitted through an iris in the telescope 15 while all other orders are blocked. The beam is diffracted from the grating 16 to create a spectrally dispersed beam 46 which is collimated by the collimating lens 17 and relayed onto the back focal aperture of the illumination objective 18. The illumination objective 18 focuses the spectrally dispersed beam 46 to a focal plane or focal volume which intersects and/or is located in the fluorescent sample 4. The size of the focal plane, i.e. the Field Of View (FOV) is 90×90 μm² and the maximum laser intensity on the fluorescent sample 4 is 64±5 mW/μm². From the foregoing description, one of ordinary skill in the art will understand that for each spatial pattern 11 of incident electromagnetic radiation, the illumination arrangement 10 uses temporal focusing for scanning-less wide-field multi-photon excitation of the fluorescent sample 4.

The illumination objective 18 collects a portion of the fluorescence 22 generated in the fluorescent sample 4 for each spatial pattern 11 of incident electromagnetic radiation. The collected portion of the fluorescence 22 is then coupled via the dichroic mirror 24 and the focusing lens 26 to the EMCCD camera 28 which measures, for each spatial pattern 11 of incident electromagnetic radiation, the portion of the fluorescence 22 generated by the fluorescent sample 4 as a result of the multi-photon excitation of the fluorescent sample 4. It should be understood that although the EMCCD camera 28 includes a plurality of the pixels, the EMCCD camera 28 is configured to measure the total fluorescence 22 incident on the plurality of the pixels or the total fluorescence 22 incident on a subset of the plurality of the pixels for each spatial pattern 11 of electromagnetic radiation used to illuminate the fluorescent sample 4. In other words, the EMCCD camera 28 does not distinguish between the fluorescence 22 incident on different pixels and does not measure the spatial distribution of the fluorescence 22 incident upon the EMCCD camera 28. As such, the EMCCD camera 28 effectively operates as a single pixel detector.

The processing resource 52 of the controller 50 then uses the measured total fluorescence 22 for each spatial pattern 11 of incident electromagnetic radiation to determine an image of the fluorescent sample 4 with no a priori knowledge of the fluorescent sample 4 or the scattering medium 6 i.e. without any aberration correction for scattering in the fluorescent sample 4 or in the scattering medium 6. Specifically, the processing resource 52 of the controller 50 constructs an image of the fluorescent sample 4 from knowledge of each Hadamard spatial pattern 11 and the corresponding total fluorescence 22 measured by the EMCCD camera 28 using an image construction pursuit algorithm in the form of an orthogonal matching pursuit algorithm.

Figure 2:
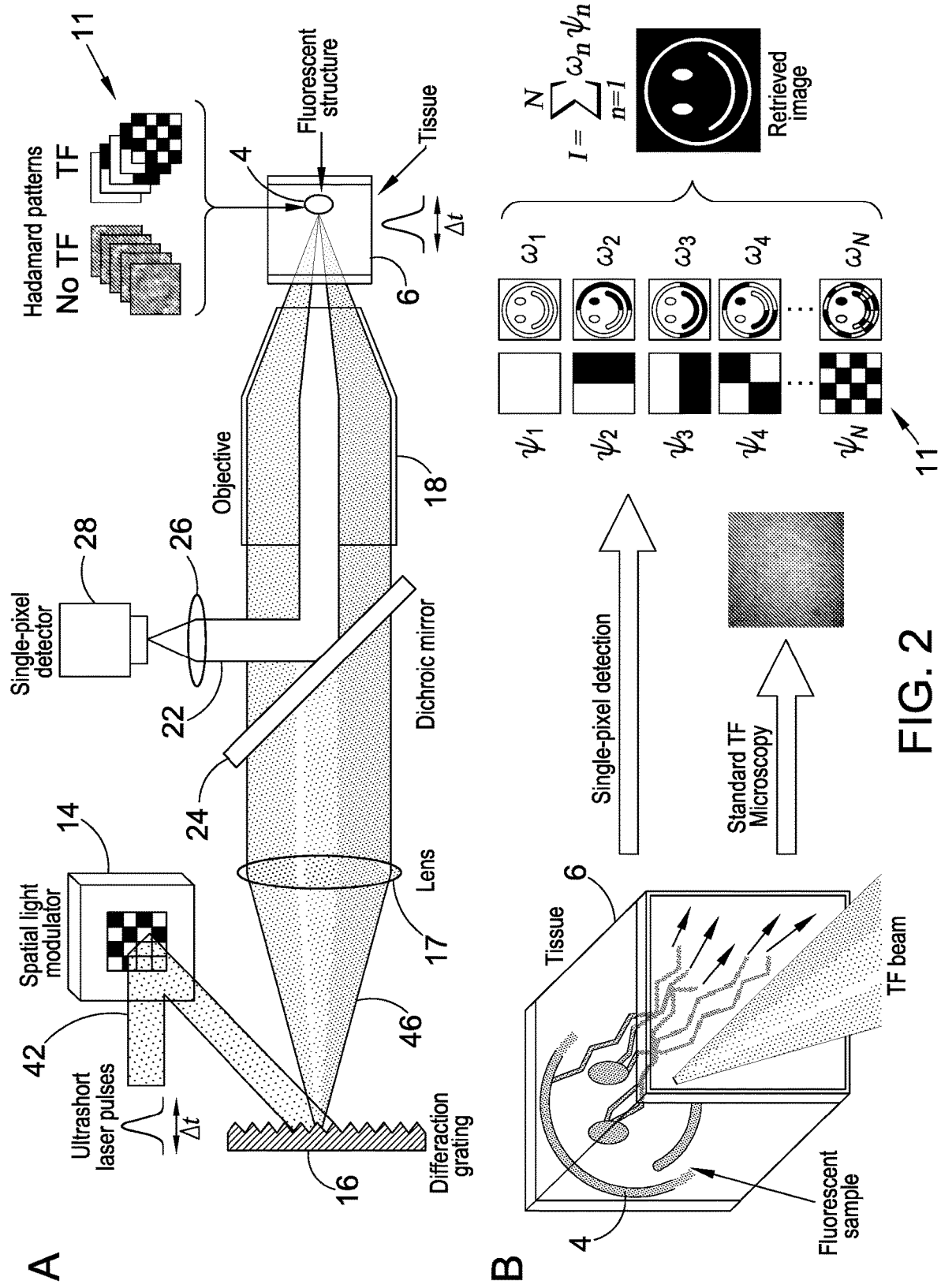
FIG. 2A illustrates the optical arrangement of the multi-photon imaging system of FIG. 1 used for TempRAI Focussing Microscopy with Single PIXel Detection (TRAFIX)
FIG. 2B illustrates the working principle of TRAFIX.

FIGS. 2A and 2B illustrate the working principle of the TempRAI Focussing Microscopy with Single PIXel Detection (TRAFIX) method implemented using the imaging system of FIG. 1. In FIG. 2A, a femtosecond laser beam 42 is expanded onto the spatial light modulator (SLM) 14 that generates Hadamard patterns 11. Subsequently, the beam is diffracted from the grating 16 and the Hadamard patterns 11 are projected onto the fluorescent sample 4 after propagating through a scattering medium 6. Fluorescent light emitted by the sample 4 is collected by the same objective 18 after passing through the scattering medium 6 a second time (epifluorescence geometry) and the total intensity is measured by the single-pixel detector 28. It should be understood that in FIG. 2A, in contrast to FIG. 1, the fluorescent sample 4 is shown embedded in the scattering medium 6. In other embodiments, the TRAFIX method may be used to image a fluorescent sub-surface region of a sample through a scattering surface region of the same sample.

In FIG. 2B, a temporal focused (TF) beam propagates through a scattering or turbid medium in the form or tissue 6 with minimal distortion retaining the integrity of illumination patterns 11 in the sample plane. Emitted fluorescent photons scatter as they propagate back through the tissue 6. In contrast to standard TF microscopy, TRAFIX tolerates scrambling of back-propagating light since only an intensity measurement is performed. In a single-pixel measurement, the fluorescent target is sequentially illuminated with Hadamard patterns ($\psi_n$) and the total intensity detected is stored as a coefficient ($\omega_n$). The gray background in the second column in FIG. 2B denotes regions of zero intensity. By adding up the Hadamard patterns weighted by their respective coefficients, an image of the fluorescent sample 4 is reconstructed.

Temporal focussing (TF) is based on decomposing an incident ultrashort pulsed light field into its constituent wavelengths with a diffraction grating. Each wavelength propagates along an individual path in the optical system and these constructively recombine to regain the original pulse duration only at the plane conjugate to the grating, generating axially confined multiphoton excitation.

In TRAFIX, orthonormal light patterns (for example in a Hadamard basis) are temporally focused through a turbid medium to illuminate a fluorescent microscopic sample of interest. The use of TF for this projection ensures the retention of the integrity of these patterns at any given plane within the turbid media (FIG. 2A). This can be regarded as due to the fact that ballistic photons remain unperturbed all the way to the object plane and arrive at the same time, contributing to the reconstitution of the pulse. In addition, the superposition of wavelets of slightly different wavelengths at the focal plane results in nearly speckle-free propagation through long distances in scattering media. We confirm these aspects here with a numerical simulation. A scattering medium may affect the spatial and temporal degrees of freedom of an input field differently. In the time domain, the temporal profile of femtosecond pulses is not significantly distorted at substantial imaging depths such as 1-mm-thick brain tissue. As a consequence, TF may induce much more efficient multiphoton excitation when compared to standard point-focusing where spatial speckle greatly reduces the photon density at the focal spot. Consequently, TF is more robust than conventional focusing resulting in a more intense fluorescence signal generated at large depths which is a major attribute for our approach. The total intensity emitted by the fluorescent sample under each illumination pattern is collected by the same objective after passing a second time through the scattering material, in a configuration reminiscent of a single-pixel imaging. In this way we remove the requirement for any spatial resolution on the imaging path which in turn means we can readily tolerate the scrambling of the emitted fluorescence through the scattering medium (FIG. 2B). We retain exact spatial information of where the sample is illuminated by virtue of using pattered illumination. This allows an original form of TF microscopy to be realised, enabling the use of the full penetration capabilities of TF beams for imaging at depth.

In the imaging system 2 of FIG. 1, the illumination laser 12 has a central wavelength at 800 nm and delivers 140 fs pulses (80 MHz repetition rate, average output power up to 4 W) onto the sample 4 and the emitted fluorescent photons are detected by an EMCCD camera 28 which is used as a single-pixel detector. The epi-fluorescence configuration of TRAFIX makes it readily suitable for a suite of biomedical applications. An additional microscope 32 takes reference images of the fluorescent sample in a transmission geometry. Reference images are taken with the CCD camera 36 under uniform TF illumination across the field of view (FOV). This additional reference system is not required for imaging. Once all patters have been sequentially projected and their intensity coefficients measured, images are reconstructed using an orthogonal matching pursuit (OMP) algorithm. The OMP algorithm determines which patterns contribute most effectively to the image reconstruction and sums them up to create an image. The number of pixels in the retrieved image is determined by the size of the Hadamard basis used in the measurement.

An n×n pixels image requires a Hadamard basis containing $N=n^2$ patterns. Therefore, depending on the pixel resolution required, different number of Hadamard patterns (typically 4,096 or 1,024) are encoded on the SLM (14). The acquisition time of the microscope is given by $T=2n^2(t_{exp}+t_{SLM})$, where $t_{exp}$ is the exposure time of the camera used as a single-pixel detector and $t_{SLM}$ is the time required to refresh the Hadamard patterns on the SLM (including data transmission).

As TRAFIX is based on patterned illumination, it lends itself to compressive sensing measurements. One of the main advantages of compressive sensing is that sparse signals can be reconstructed with fewer samples than required by Nyquist sampling theory. In terms of microscopy, it means that one does not need to measure with the full set of Hadamard patters to obtain a good quality image. The compression ratio CR=N/M denotes how many patterns are used to reconstruct the image in relation to the total number of patterns in the Hadamard basis. Here, M is the number of patterns used in the reconstruction algorithm. For example, a 64×64 pixels image requires a measurement with a Hadamard basis containing 4,096 patterns. Consequently, a CR of 2 corresponds to using only half of the total patterns to reconstruct the image, i.e. 2,048 patterns, a CR=4 uses only 1,024 patterns and so on.

Compressive sensing is a signal processing technique for acquiring and reconstructing signals with fewer measurements than required by the Nyquist sampling theorem. Any signal or image, x, can be expanded as a sum of weighted basis functions:

$$x = \sum_{n=1}^{N} \omega(n)\psi_n \qquad \text{Equation 1}$$

where $\psi_n$ are the basis functions, $\omega(n)$ are the weighting coefficients and N is the total number of pixels. In order to represent an image with perfect accuracy, the number of basis functions used in the reconstruction should be the same as the total number of pixels in the image. It is also well known that the Nyquist sampling theorem states that the sampling rate must be at least twice the highest frequency that needs to be resolved. However, if the image is sparse, compressive sensing can break this limit and reconstruct images or signals with far fewer samples or measurements than required by Nyquist theory. Sparse images can be defined as images in which most weighting coefficients are small and only a few of them are relatively large so image quality is not lost by neglecting the smallest ones. Therefore, there is no need to measure all the basis coefficients, instead, one can make only a few random measurements that have equal probability of obtaining relevant data and with the information captured, the image can be reconstructed. In terms of Equation 1, a good image can be reconstructed by only summing K weighted basis functions with K much smaller than N:

$$x \cong \sum_{l=1}^{K} \omega(l)\psi_l \qquad \text{Equation 2}$$

The reconstruction process can be further optimized by using algorithms as described below.

In TRAFIX, the sample is illuminated by microstructured light patterns, each corresponding to a basis function, and the total intensity emitted by the sample for each pattern is measured with a photodetector. Different sets of bases can be used to perform a single-pixel measurement. The performance of a digital (Hadamard), a grayscale (discrete cosine transform) and a random (Noiselet) set of bases have been compared. A random set of bases like the Noiselet, may provide a more uniform sampling and higher spatial frequency information is present in the reconstructed images. However, more images are needed to converge to a visually appealing solution. Spatially structured patterns such as the Hadamard or discrete cosine transform, may interact with the structure of the sample and certain weighting coefficients may stand out, which on most occasions, helps reaching more easily a better solution. In general, it has been concluded that the Hadamard basis may provide better results.

In the TRAFIX microscope of FIG. 1, single-pixel measurements are performed with an a posteriori approach to compressive sensing. A basis formed of Hadamard patterns is considered whose entries are either 1 or –1. Two important properties of Hadamard matrices are that their rows are orthogonal and they fulfil the following condition:

$$HH^T = nI_n \qquad \text{Equation 3}$$

where H is a Hadamard matrix and I an identity matrix of dimension n. Hadamard matrices are encoded on the SLM 14 and the corresponding patterns are projected onto the sample 4 after propagating through the turbid or scattering medium 6. As the number of pixels in the reconstructed image is determined by the size of the basis, two different sets of Hadamard bases containing 1,024 and 4,096 elements are used to obtain images of 32×32 pixels and 64×64 pixels, respectively. Since Hadamard matrices are made of –1 and 1, each pattern is split into a sequence of two complementary patterns, one containing the positive portion and the other one the negative portion of the pattern. Then, measurements taken with the negative part of the basis are subtracted from the positive portion obtaining a weight coefficient for each element of the Hadamard basis. The background is subtracted from each measurement. Once all patterns are projected and their weights are determined, the final image is reconstructed by summing them up as described in Equation 1. However, if only a few patterns are used in the reconstruction, a different compression ratio (CR) may be obtained. Reconstruction with fewer patterns is equivalent to taking very few measurements in the first place. In order to optimize the reconstruction process an orthogonal matching pursuit (OMP) algorithm is implemented as described in J. A. Tropp, et al. "Signal Recovery From Random Measurements Via Orthogonal and Matching Pursuit", *IEEE Trans. Inf. Theory*, 53, 4655-4666 (2007) and J. M. Phillips, "Compressed sensing and orthogonal matching pursuit", CS6140 data mining, University of Utah (2017).

As will be described in more detail below, the reference transmission imaging system 30 also provides reference images of the fluorescent sample 4 for comparison with the images of the fluorescent sample 4 determined by the processing resource 52 of the controller 50.

To demonstrate the performance of the imaging system 2, various microscopic fluorescent samples were imaged through different turbid or scattering media. In each case, the central wavelength of the laser 12 is 800 nm for two-photon excitation of the fluorescent sample 4 unless otherwise stated.

The signal-to-background ratio (SBR) was calculated according to the definition $SBR=\mu_{sig}/\mu_{bg}$, where $\mu_{sig}$ and $\mu_{sg}$ are the average values of the signal and the background, respectively. In the case of cells and fluorescent micropatterns, two small regions-of-interest (ROI) were defined, one containing fluorescent structures and the other corresponding to the background. In the images of beads, the highest intensity pixels in the beads were used as signal value and the maximum intensity pixels in the rest of the image as background noise. Uncertainty is given by the standard deviation of all averaged measurements. All values of SBR presented in this work are summarized in Table 1. Different columns in Table 1 correspond to retrieved images obtained through scattering media with TRAFIX at different compression ratios (CR).

TABLE 1

SIGNAL-TO-BACKGROUND RATIO

|  | CS (CR = 1) | CS (CR = 2) | CS (CR = 4) | CS (CR = 8) |
|---|---|---|---|---|
| Beads Without Scattering | 14.9 ± 1.5 | 11.6 ± 1.0 | 6.4 ± 0.7 | 3.7 ± 0.4 |
| Beads Phantom | 5.5 ± 2.1 | 4.2 ± 1.8 | 3.9 ± 1.5 | 2.6 ± 0.7 |
| Beads Colon | 5.4 ± 1.0 | — | — | — |
| Cells Without Scattering | 14.8 ± 2.6 | 11.5 ± 1.6 | — | — |
| Cells Phantom | 4.9 ± 1.5 | 4.3 ± 0.4 | — | — |
| Cells Colon | 4.6 ± 0.3 | — | — | — |

Figure 3:
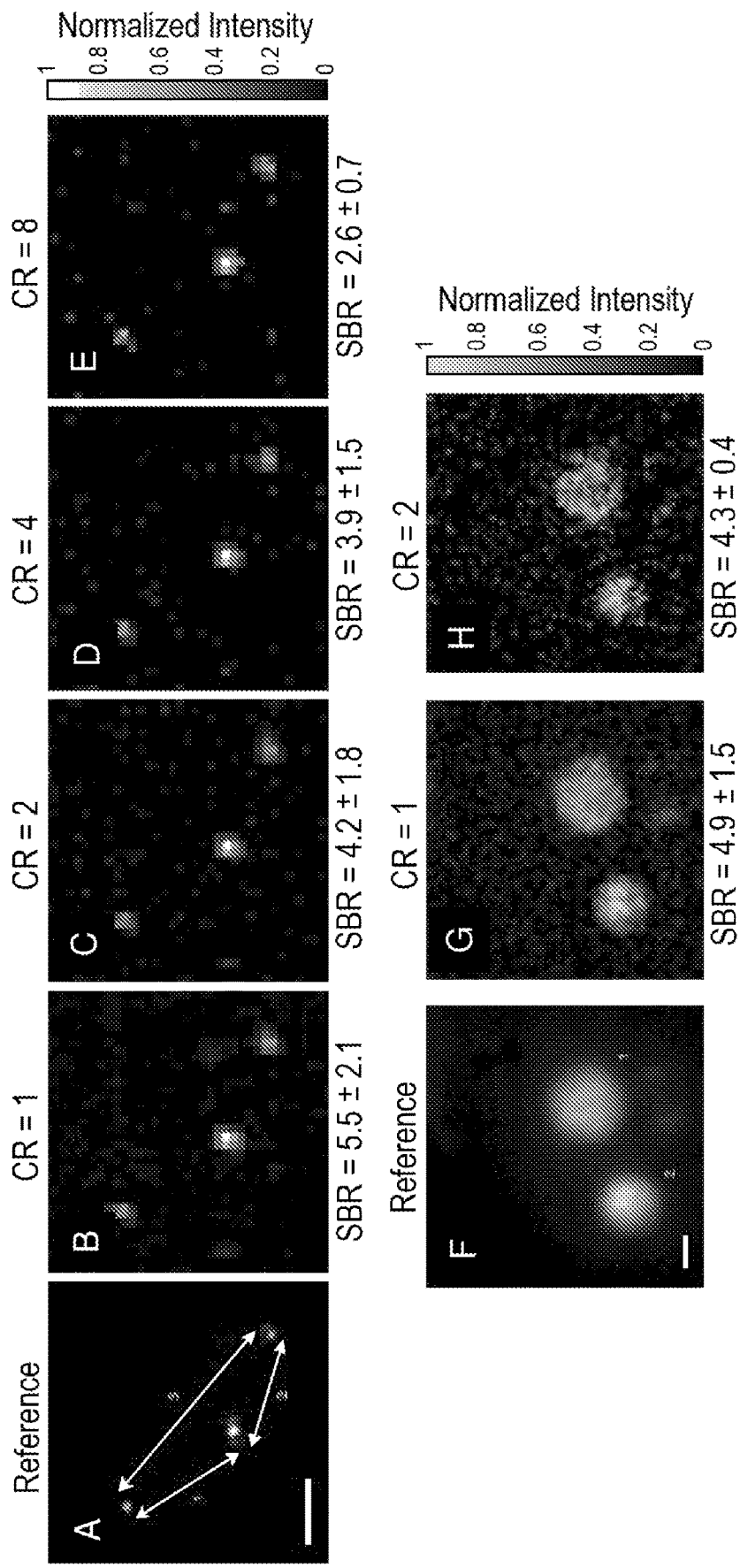
FIG. 3A shows a reference image of 400 nm diameter fluorescent beads obtained through a 500 μm thick scattering phantom using the reference transmission imaging system of FIG. 1.
FIG. 3B shows an image of the fluorescent beads of FIG. 3A obtained through the 500 μm thick scattering phantom using the multi-photon imaging system of FIG. 1 to perform TRAFIX for a compression ratio of 1.
FIG. 3C shows an image of the fluorescent beads of FIG. 3A obtained through the 500 μm thick scattering phantom using the multi-photon imaging system of FIG. 1 to perform TRAFIX for a compression ratio of 2.
FIG. 3D shows an image of the fluorescent beads of FIG. 3A obtained through the 500 μm thick scattering phantom using the multi-photon imaging system of FIG. 1 to perform TRAFIX for a compression ratio of 4.
FIG. 3E shows an image of the fluorescent beads of FIG. 3A obtained through the 500 μm thick scattering phantom using the multi-photon imaging system of FIG. 1 to perform TRAFIX for a compression ratio of 8.
FIG. 3F shows a reference image of fluorescent Human Embryonic Kidney (HEK) cells obtained through a 540 μm thick scattering phantom using the reference transmission imaging system of FIG. 1.
FIG. 3G shows an image of the fluorescent HEK cells of FIG. 3F obtained through the 540 μm thick scattering phantom using the multi-photon imaging system of FIG. 1 to perform TRAFIX for a compression ratio of 1.
FIG. 3H shows an image of the fluorescent HEK cells of FIG. 3F obtained through the 540 μm thick scattering phantom using the multi-photon imaging system of FIG. 1 to perform TRAFIX for a compression ratio of 2.
Figure 4:
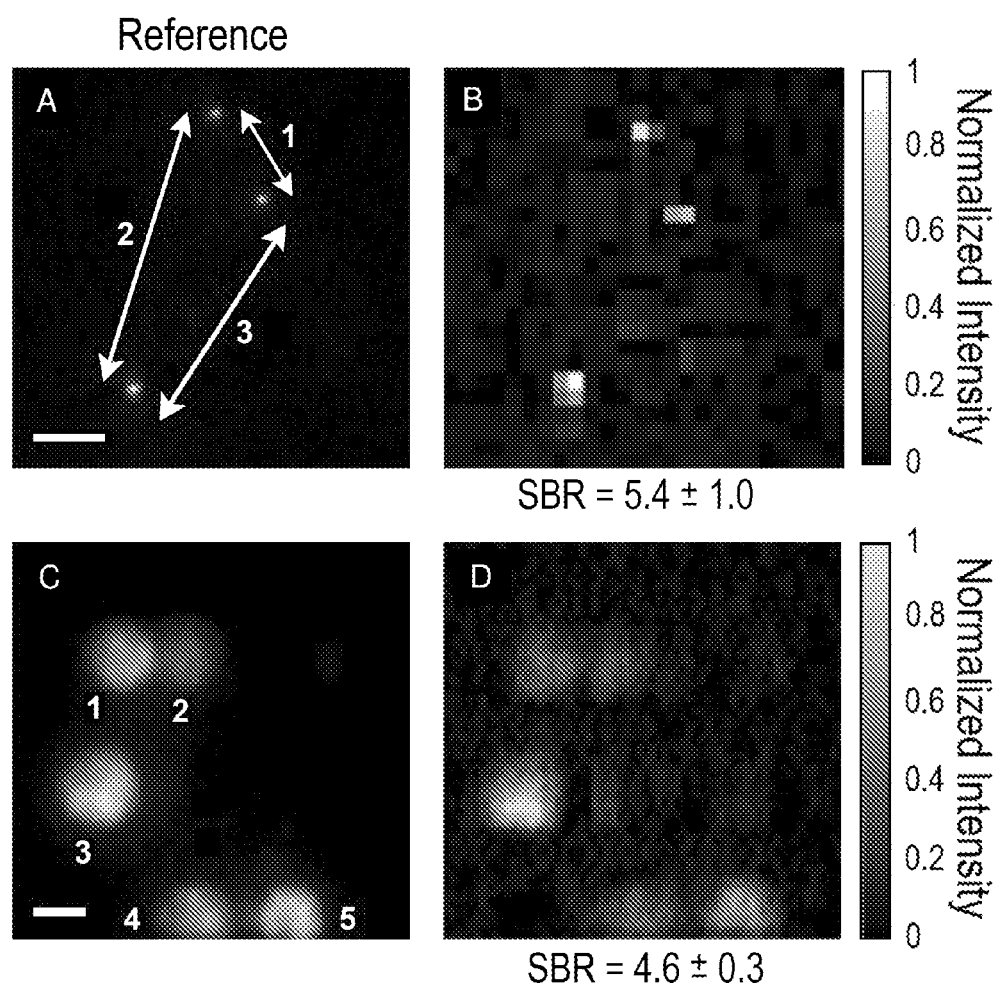
FIG. 4A shows a reference image of 400 nm fluorescent beads obtained through 250 μm of human colon tissue using the reference transmission imaging system of FIG. 1.
FIG. 4B shows an image of the fluorescent beads of FIG. 4A obtained through 250 μm of human colon tissue using the multi-photon imaging system of FIG. 1 to perform TRAFIX for a compression ratio of 1.
FIG. 4C shows a reference image of fluorescent HEK cells obtained through 200 μm of human colon tissue using the reference transmission imaging system of FIG. 1.
FIG. 4D shows an image of the fluorescent HEK cells of FIG. 4C obtained through 200 μm of human colon tissue using the multi-photon imaging system of FIG. 1 to perform TRAFIX for a compression ratio of 1.
Figure 12:
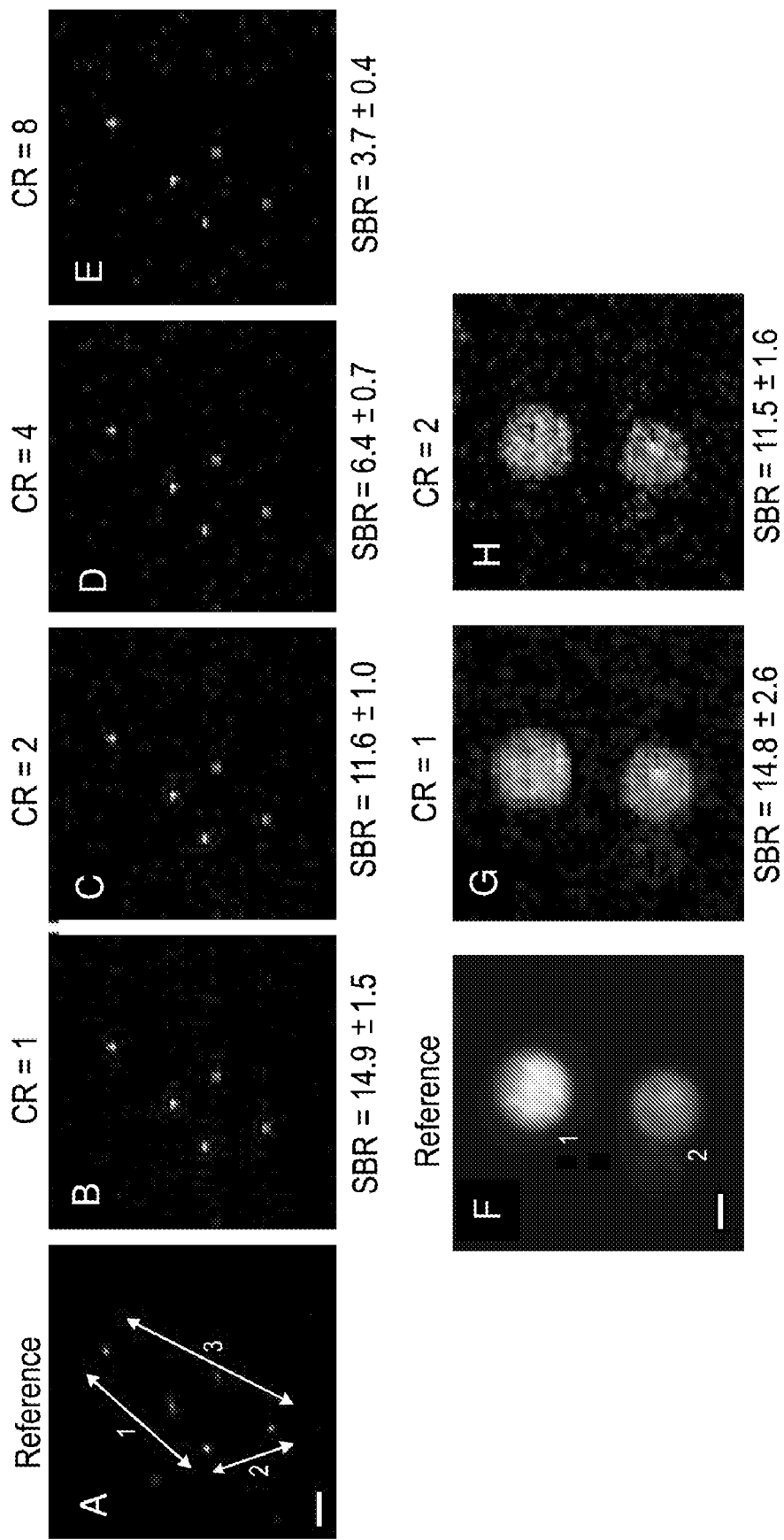
FIG. 12A shows a reference image of 400 nm diameter fluorescent beads obtained without scattering using the reference transmission imaging system of FIG. 1.
FIG. 12B shows an image of the fluorescent beads of FIG. 12A obtained without scattering using the multi-photon imaging system of FIG. 1 to perform TRAFIX for a compression ratio of 1.
FIG. 12C shows an image of the fluorescent beads of FIG. 12A obtained without scattering using the multi-photon imaging system of FIG. 1 to perform TRAFIX for a compression ratio of 2.
FIG. 12D shows an image of the fluorescent beads of FIG. 12A obtained without scattering using the multi-photon imaging system of FIG. 1 to perform TRAFIX for a compression ratio of 4.
FIG. 12E shows an image of the fluorescent beads of FIG. 12A obtained without scattering using the multi-photon imaging system of FIG. 1 to perform TRAFIX for a compression ratio of 8.
FIG. 12F shows a reference image of fluorescent Human Embryonic Kidney (HEK) cells obtained without scattering using the reference transmission imaging system of FIG. 1.
FIG. 12G shows an image of the fluorescent HEK cells of FIG. 12F obtained without scattering using the multi-photon imaging system of FIG. 1 to perform TRAFIX for a compression ratio of 1.
FIG. 12H shows an image of the fluorescent HEK cells of FIG. 12F obtained without scattering using the multi-photon imaging system of FIG. 1 to perform TRAFIX for a compression ratio of 2.

Table 2 shows the cell diameters of images shown in this work. Cells correspond, in order, to FIG. 12, FIG. 3 and FIG. 4. The deviation from the reference value is shown in the last two columns.

TABLE 1

|  |  | Diameter FWHM (μm) | | | Deviation (%) | |
|---|---|---|---|---|---|---|
|  | Cell | Reference | CR = 1 | CR = 2 | CR = 1 | CR = 2 |
| Without scattering | 1 | 19.20 | 18.92 | 20.44 | 1.5 | 6.4 |
|  | 2 | 16.31 | 16.35 | 14.73 | 0.2 | 9.7 |
| Scattering phantom | 1 | 20.66 | 20.64 | 19.23 | 0.1 | 6.9 |
|  | 2 | 14.32 | 13.86 | 12.71 | 3.3 | 11.2 |
| Colon tissue | 1 | 13.07 | 13.91 | — | 6.5 | — |
|  | 2 | 13.94 | 11.71 | — | 16.0 | — |
|  | 3 | 13.22 | 12.07 | — | 8.6 | — |
|  | 4 | 12.22 | 13.32 | — | 9.1 | — |
|  | 5 | 11.65 | 12.53 | — | 7.6 | — |

Table 3 shows the bead spacing corresponding to images shown in this work. They refer, in order, to FIG. 12, FIG. 3 and FIG. 4. The deviation from the reference value is shown in the last four columns.

TABLE 3

|  |  | Distance (μm) | | | | | Deviation (%) | | | |
|---|---|---|---|---|---|---|---|---|---|---|
|  | No. | Ref. | CR = 1 | CR = 2 | CR = 4 | CR = 8 | CR = 1 | CR = 2 | CR = 4 | CR = 8 |
| Without scattering | 1 | 42.19 | 40.99 | 40.29 | 41.46 | 40.38 | 2.8 | 4.5 | 1.7 | 4.2 |
|  | 2 | 20.40 | 19.16 | 19.81 | 19.73 | 19.54 | 6.1 | 2.9 | 3.3 | 4.3 |
|  | 3 | 55.25 | 52.95 | 52.15 | 54.02 | 52.88 | 4.2 | 5.6 | 2.2 | 4.2 |
| Scattering phantom | 1 | 23.21 | 23.07 | 23.05 | 23.51 | 23.57 | 0.6 | 0.7 | 1.3 | 1.6 |
|  | 2 | 18.36 | 17.87 | 18.04 | 18.19 | 18.80 | 2.7 | 1.7 | 0.9 | 2.4 |
|  | 3 | 39.90 | 40.04 | 40.04 | 39.37 | 39.69 | 0.4 | 0.4 | 1.3 | 0.5 |
| Colon tissue | 1 | 13.38 | 15.39 | — | — | — | 15.0 | — | — | — |
|  | 2 | 38.31 | 44.55 | — | — | — | 16.3 | — | — | — |
|  | 3 | 30.77 | 35.88 | — | — | — | 16.0 | — | — | — |

To begin with, 400 nm diameter green fluorescent beads and fixed Human Embryonic Kidney (HEK293T/17) cells labelled with Green Fluorescent Protein (GFP) were imaged through scattering phantoms, designed to mimic the scattering properties of biological tissue, and through unfixed human colon tissue. A custom-made fluorescent microstructure was then imaged through fixed rat brain tissue. As scattering clearly dominates over absorption in the range of wavelengths considered, a scattering mean free path ($l_s$) is used as a reference value to quantify imaging depth. The $l_s$ for the scattering media used in the experiments presented here are approximately 140 μm, 85 μm and 55 μm for the scattering phantom, colon tissue and brain tissue, respectively. Full Hadamard bases of either 32×32 or 64×64 pixel resolution were projected onto the samples and the resulting images were reconstructed with different CR. The lateral resolution of the microscope is defined as twice the pixel size in the reconstructed images, and thus it depends on the FOV. Using a Hadamard basis containing 32×32 pixels and a FOV of 90×90 μm², the resolution is 5.6 μm and for a larger basis of 64×64 pixels it is 2.8 μm. The depth resolution in the absence of any scattering layer for a 40× NA=0.8 objective was measured to be 4.7±0.5 μm and the microscope's performance in imaging beads and HEK cells was initially tested without scattering.

In order to quantify image quality, the signal-to-background ratio (SBR) was measured for all images presented in this work. To assess the effectiveness of this technique in photolocalization, the spacing between fluorescent beads and the size of cells in the reference image and in the reconstructed images were estimated and their deviation from the reference value was then calculated.

FIGS. 3A-3H show the results of imaging fluorescent microscopic samples through scattering phantoms which were designed to match roughly the scattering coefficient of real biological tissue. The scattering phantom was formed from polystyrene beads of 1 μm diameter used as scatterers to simulate a turbid or scattering medium. The beads were purchased in a 1% concentration solution in water (Polysciences, Microbead NIST Traceable Particle Size Standard, 1.00 μm). The solution was thoroughly stirred in a vortex mixer and then mixed with a 1% solution of agarose in water (preheated above melting point). Agarose and beads were mixed in the vortex mixer again and placed into sample wells of variable height. The wells consisted of a 100 μm glass slide with multiple 90 μm vinyl spacers forming the wells. An additional cover slip was placed on top to seal the well. The concentration of polystyrene beads in the sample was chosen to match roughly the scattering coefficient of real biological tissue. Using an online Mie scattering calculator the reduced scattering coefficient of the scattering phantom was determined to be approximately 7.5 cm$^{-1}$ corresponding to a mean free path of about ls~140 µm.

FIGS. 3A-3E are images of 400 nm diameter fluorescent beads imaged through 500 µm of scattering phantom. The 400 nm diameter green fluorescent beads used were Green Fluorescent Polymer Microspheres G400 (Duke Scientific) with a diameter of 0.39 µm. Some beads were deposited on a glass coverslip and placed on top of the scattering samples to image them through the scattering phantoms.

FIGS. 3F-3H are images of fixed Human Embryonic Kidney (HEK293T/17-GFP) cells through 540 µm of scattering phantom. The HEK cells were labelled with Green Fluorescence Protein (GFP). Human Embryonic Kidney 293T/17 cell line obtained from ATCC® is a derivative of the 293T cell line, highly transfectable derivative of the 293 cell line. The HEK 293T/17 were cultured in Dulbecco's Modified Eagle's Medium GlutaMAXTM-I supplemented with 10% Fetal Bovine Serum and 1% Pen/Strep and was transfected using TransIT-LT1 Transfection Reagent with the lentiviral envelope vector pSD11(VSV-G) and packaging vector pSD16 to deliver the plasmid pLenti-GFP-Puro. Regarding the sample preparation, the HEK 293T/17 expressing GFP were replated on WPI Fluorodish™ poly-D-Lysine-coated cell culture dishes at a low density to achieve ideal imaging conditions. The day after plating, prior to imaging, the HEK293T/17-GFP cells were fixed in a PBS 4% paraformaldehyde solution. The scattering samples were attached directly on the bottom of the dishes containing the cells.

FIGS. 3B and 3G were obtained in the epi-fluorescence configuration with temporal focusing using a Hadamard basis containing 4096 illumination patterns and single-pixel detection. The measurement of the fluorescence for each Hadamard illumination pattern was taken with a binning of 64 and an exposure time of 0.5 s. The lateral resolution of the microscope is determined by the pixel size in the constructed images. Using a Hadamard basis containing 4096 patterns the resolution is 2.8 µm. The depth resolution without any scattering layer was measured to be 34.7±0.5 µm.

FIGS. 3A and 3F are wide-field temporal focusing reference images measured in transmission using the CCD camera 36 of the reference transmission imaging system 30 for an exposure time of 20 s and camera binning of 4 and 2, respectively. It is clear from a comparison of the wide-field temporal focusing images of FIGS. 3B and 3G measured using the Hadamard illumination patters and single-pixel detection with the corresponding wide-field temporal focusing reference images of FIGS. 3A and 3F respectively, that the use of temporal focusing in combination with the Hadamard illumination patters and single-pixel detection is capable of providing images of the fluorescent sample 4 of good quality in an epi-fluorescence configuration without any a priori knowledge or characterisation of the fluorescent sample 4 or the scattering medium 6.

As a result of the strong scattering, very few illumination photons reach the plane of the fluorescent sample 4 generating a very dim fluorescence signal, therefore long exposure time or large binning is required to even obtain a good reference image in transmission. In conventional multi-photon excitation microscopes, those few emitted fluorescence photons would need to travel back through the thick scattering medium losing all their spatial information resulting in uniform noise on a camera. Consequently, the SNR would essentially be zero. However, for the imaging system 2 of FIG. 1 which combines temporal focusing microscopy with illumination using the Hadamard patterns and single-pixel detection, there is no need to measure spatial information because the total fluorescence generated for each Hadamard excitation pattern is detected and used to construct the image. That provides a great signal enhancement and higher SNR values can be achieved than with conventional multi-photon excitation microscopes.

Moreover, the use of an orthonormal basis set such as a set of Hadamard radiation patterns and single-pixel detection allows the use of compressive sensing measurements to construct the images of the fluorescent beads. The images shown in FIGS. 3C-3E were constructed a posteriori with different compression ratios to show that compressive sensing measurements are also plausible in this configuration. One of the main advantages of compressive sensing is that sparse signals can be constructed with fewer samples than required by Nyquist sampling theory. In terms of microscopy, it means that we do not need to measure with the full Hadamard basis to obtain a good quality image. The compression ratio CR=N/M tells us how many patters have been used to reconstruct the image in relation to the total number of patters in the Hadamard basis. Here, M is the number of patterns used in the reconstruction algorithm. For example, a 64×64 pixels image requires a measurement with a Hadamard basis containing 4,096 patterns. Consequently, a compression ratio of 2 corresponds to using only half of the total patters to reconstruct the image, i.e. 2,048 patterns, a CR=4 uses only 1,024 patterns and so on.

The images shown in FIGS. 3C-3E using different compression ratios (CR) corresponding to 50% (CR=2), 25% (CR=4) or 12.5% (CR=8) of the total number of Hadamard patterns. The images of FIGS. 3C-3E were obtained using a Hadamard basis containing 4096 illumination patterns and single-pixel detection. The measurement of the fluorescence for each Hadamard illumination pattern was taken with a binning of 64 and an exposure time of 0.5 s. The spacing between the fluorescent beads was measured in all five images FIGS. 3A-3E and the deviations in the spacing measured in Figures FIGS. 3B-3E were smaller than 3% from the spacing measured in the reference image of FIG. 3A (as summarised in Table 3). Image quality is preserved for all compressive ratios obtained with the fluorescent beads. A good image can be faithfully constructed with only 12.5% of the total patterns (512 patters).

Similarly, compressive sensing measurements were used to construct the images of the HEK cells shown in FIG. 3H for a compression ratio (CR) corresponding to 50% (CR=2). The image of FIG. 3H was obtained using a Hadamard basis containing 4096 illumination patterns and single-pixel detection. The measurement of the fluorescence for each Hadamard illumination pattern was taken with a binning of 64 and an exposure time of 0.5 s. The diameters of the two cells in the reference image of FIG. 3F were measured to be 20.7 µm and 14.3 µm. The diameters of the same two cells measured from FIGS. 3G and 3H were found to differ by less than 4% and 12% from the corresponding diameters measured from the reference image of FIG. 3F (as summarised in Table 2).

Higher compression ratios could not be achieved with the HEK cells mainly because the 800 nm excitation laser 12 used in the experiments is not optimal for two-photon excitation of green fluorescent protein (GFP) which has a peak two-photon absorption in the range of wavelengths between 870 and 920 nm. The laser wavelength could have been shifted to match the peak two-photon absorption wavelength of GFP but the laser power would have dropped significantly. Despite this important issue, a SBR exceeding 4 was achieved at CR=2, i.e. using only 50% of the full Hadamard basis in the image construction algorithm.

The imaging system 2 was also used with fresh human colon tissue as the scattering medium 6. A problem with imaging through biological tissue can be auto-fluorescence. Specifically, under 435 nm one-photon excitation, it is known that colon tissue presents a very intense auto-fluorescence signal in the green part of the spectrum overlapping with the fluorescence emitted from the beads or cells as a result of two-photon excitation. Consequently, when using an excitation wavelength of 800 nm, two-photon absorption can occur in the colon tissue which can reduce the number of photons that can reach the beads or HEK cells and generate undesired background light. As laser pulses propagate longer distances through scattering tissue, the resulting temporal focusing excitation plane becomes thicker and due to the high intensity laser, some auto-fluorescence was excited in the colon tissue resulting in a lot of noise even in the reference images acquired from above using the reference transmission imaging system 30. Despite the intense auto-fluorescence light of the colon tissue, it is possible to image the 400 nm fluorescent beads through 250 μm of colon tissue and to image the HEK cells through 200 μm of colon tissue resulting in the images shown in FIGS. 4B and 4D respectively, obtaining high SNR values. The images of FIGS. 4B and 4D were obtained in the epi-fluorescence configuration with temporal focusing and single-pixel detection using a Hadamard basis containing 1024 and 4096 illumination patterns, respectively. All patterns were used for image reconstruction (CR=1). Camera binning for each Hadamard pattern was set to 64 and exposure time was 1 s in FIG. 4B and 0.75 s in FIG. 4D. FIGS. 4A and 4C are wide-field temporal focusing reference images measured in transmission using the reference transmission imaging system 30. Camera binning in FIG. 4A was set to 4 and the exposure time was 5 s. Camera binning in FIG. 4C was set to 1 and exposure time was 15 s. The spacing between beads and the diameter of cells were measured for image quality quantification (as summarised in Tables 3 and 2). The signal-to-background ratio (SBR) is shown for all images. The scale bars are 10 μm.

The photo-localisation analysis was very satisfactory in the case of images obtained through the scattering phantom obtaining deviations smaller than 3% for beads in any compression ratio. Acceptable results were also obtained in the case of cells for the image with no compression. In general, larger deviations were observed for the images through colon tissue presumably due to very low photon count reaching the single-pixel detector.

Fluorescent micro-patterns were also generated on a thin fluorescent film which was imaged through a scattering phantom to characterize the profile and depth resolution of the temporal focusing beam. The thin fluorescent film was also imaged through fixed mouse brain slices of different thicknesses resulting in the images shown in FIGS. 5A-5D. The thin fluorescent film was prepared by spin-coating a 200 nm thin layer of super-yellow polymer on a glass cover slip. The negative of a pattern of interest was encoded on the SLM 14 and the thin fluorescent layer was placed at the focal plane of the imaging system 2 without any scattering layer. The power of the laser 12 was set to the maximum and the negative pattern was photo-bleached on the fluorescent film. Therefore, the only portion of the field of view that remained fluorescent was exactly the microstructure of interest.

Figure 5:
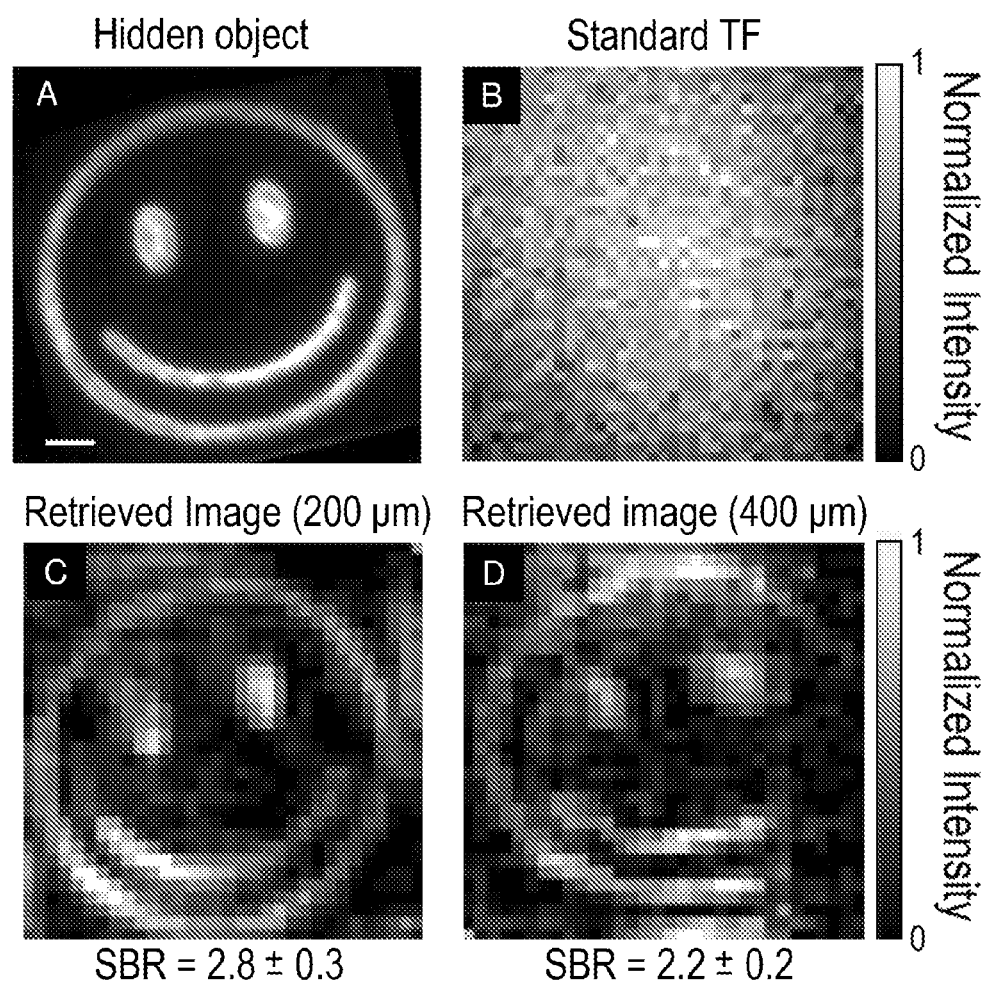
FIG. 5A shows a reference image of a fluorescent micro-pattern obtained in the absence of any scattering medium using the reference transmission imaging system of FIG. 1.
FIG. 5B shows a comparative image of the fluorescent micro-pattern obtained using the multi-photon imaging system of FIG. 1 to perform conventional temporal focussing microscopy without single pixel detection (i.e. under uniform wide-field temporally focussed illumination and wide-field detection to measure the spatial intensity distribution of the light received from the fluorescent micro-pattern) in an epi-fluorescence configuration through a 400 μm slice of rat brain tissue.
FIG. 5C shows an image of the fluorescent micro-pattern obtained through a 200 μm slice of rat brain tissue using the multi-photon imaging system of FIG. 1 to perform TRAFIX for a compression ratio of 1.
FIG. 5D shows an image of the fluorescent micro-pattern of FIG. 5A obtained through a 400 μm slice of rat brain tissue using the multi-photon imaging system of FIG. 1 to perform TRAFIX for a compression ratio of 1.

FIGS. 5A-5D compares a hidden object and the images retrieved through brain slices. FIG. 5A shows the reference image of the fluorescent micro-pattern obtained without any scattering medium measured in transmission using the reference transmission imaging system 30. FIG. 5B shows the image obtained using conventional TF microscopy without using TRAFIX, i.e. under uniform wide-field TF illumination with wide-field detection in the epi-fluorescence configuration, through 400 μm of fixed rat brain tissue. FIGS. 5C and 5D are constructed images obtained using the imaging system 2 to perform TRAFIX in the epi-fluorescence configuration through brain slices of 200 μm and 400 μm, respectively. The two retrieved images were constructed using a full Hadamard basis containing 1024 patterns. The scale bar is 10 μm. The maximum imaging depth achieved through mouse brain slices was 350 μm. At thicknesses of the order of, or larger than, 400 μm, Hadamard patterns turn into speckle and no spatial information can be retrieved.

Figure 6:
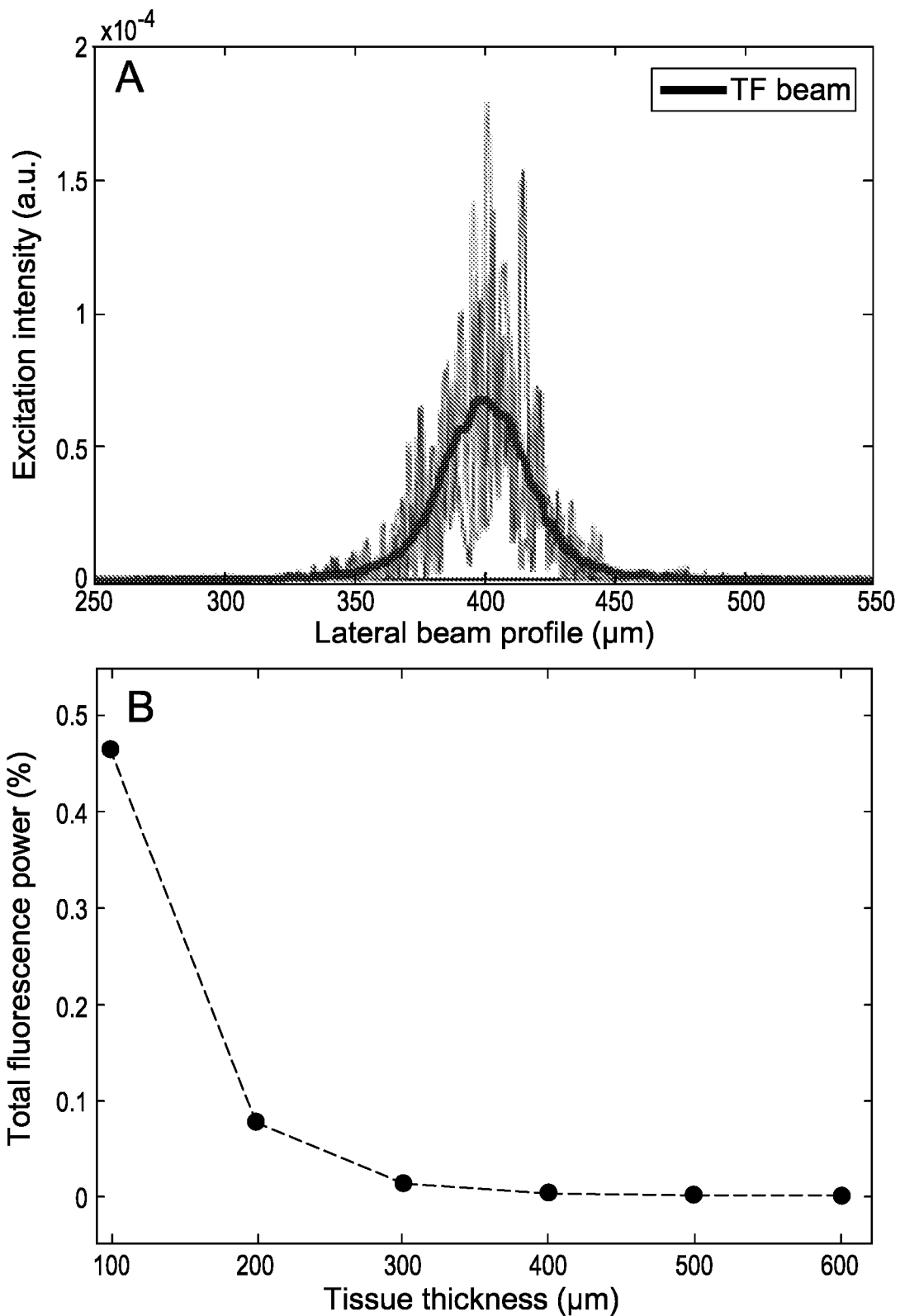
FIG. 6A shows the lateral beam profiles of simulated temporal focused laser beams at several different wavelengths across the wavelength range of the incident beam of ultrashort laser pulses and the total lateral beam profile of the simulated temporal focused laser beams at the focal plane after propagation through a 400 μm slice of brain tissue (see solid curve)
FIG. 6B shows the total fluorescence power collected using a NA=0.8 microscope objective for different thicknesses of brain tissue.

FIGS. 6A and 6B illustrate numerical simulation results for the TRAFIX method in scattering media. FIG. 6A shows the simulated TF laser beams at the focal plane through a 400 μm thick brain tissue. The solid red curve indicates the smoothed-out lateral beam profile taking all monochromatic components of the laser pulse into account. FIG. 6B shows the total fluorescence power collected using a NA=0.8 microscope objective for different thicknesses of brain tissue. Incident laser power at sample surface is set to 100 (a.u.).

Numerical Simulations

Figure 7:
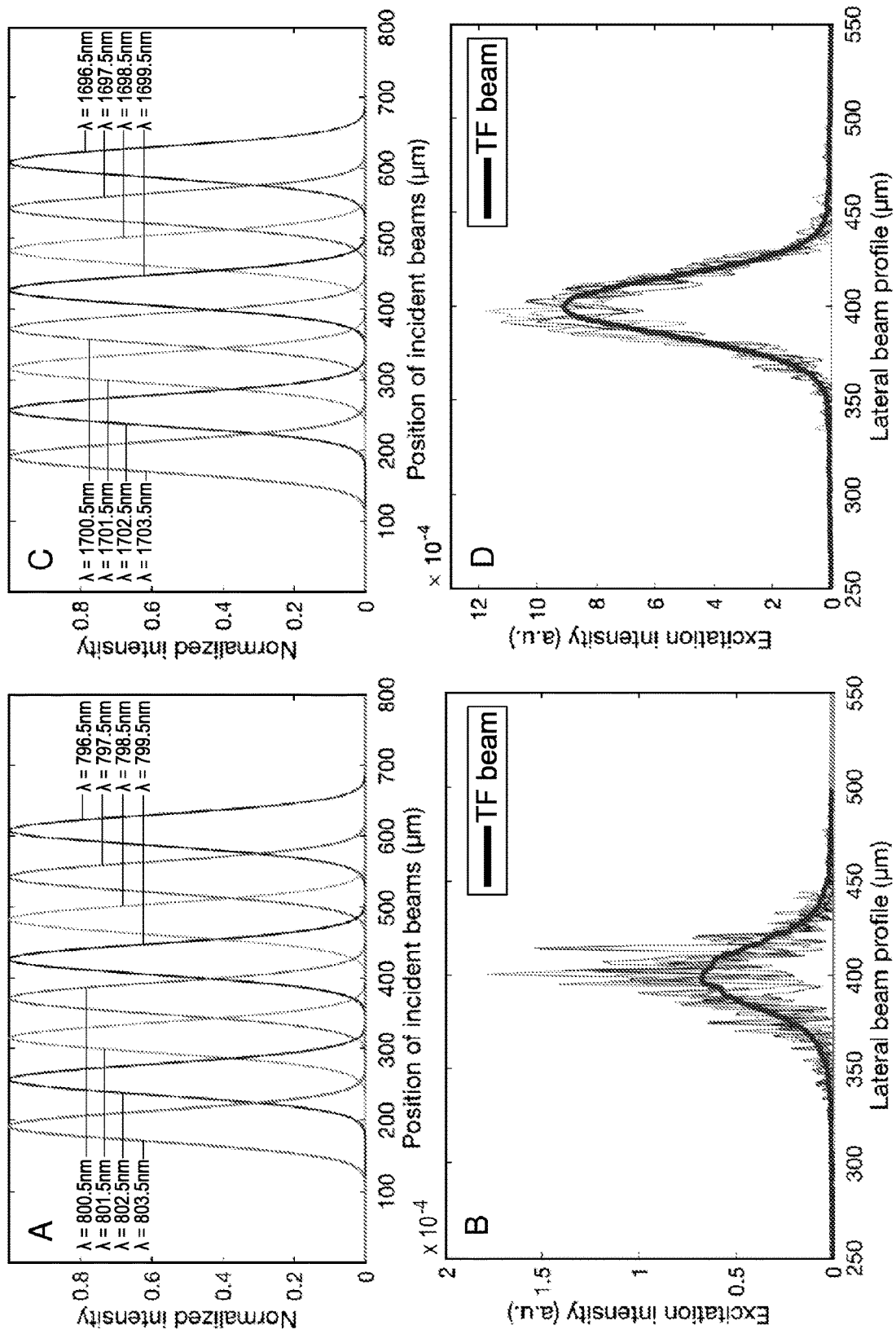
FIG. 7A shows simulated dispersed Gaussian beams at a surface of a scattering medium for different individual wavelengths associated with a laser pulse having a centre wavelength of 800 nm for two-photon excitation using the multi-photon imaging system of FIG. 1 to perform TRAFIX.
FIG. 7B shows the simulated excitation beams for the different individual wavelengths at the focal plane corresponding to the dispersed Gaussian beams of FIG. 7A and the profile of the resulting temporal focused beam after propagating through the 400 μm thick sample brain tissue (see solid curve)
FIG. 7C shows simulated dispersed Gaussian beams at a surface of a scattering medium for different individual wavelengths associated with a laser pulse having a centre wavelength of 1700 nm for three-photon excitation using the multi-photon imaging system of FIG. 1 to perform TRAFIX.
FIG. 7D shows the simulated excitation beams for the different individual wavelengths at the focal plane corresponding to the dispersed Gaussian beams of FIG. 7C and the profile of the resulting temporal focused beam after propagating through the 400 μm thick sample brain tissue (see solid curve)
Figure 8:
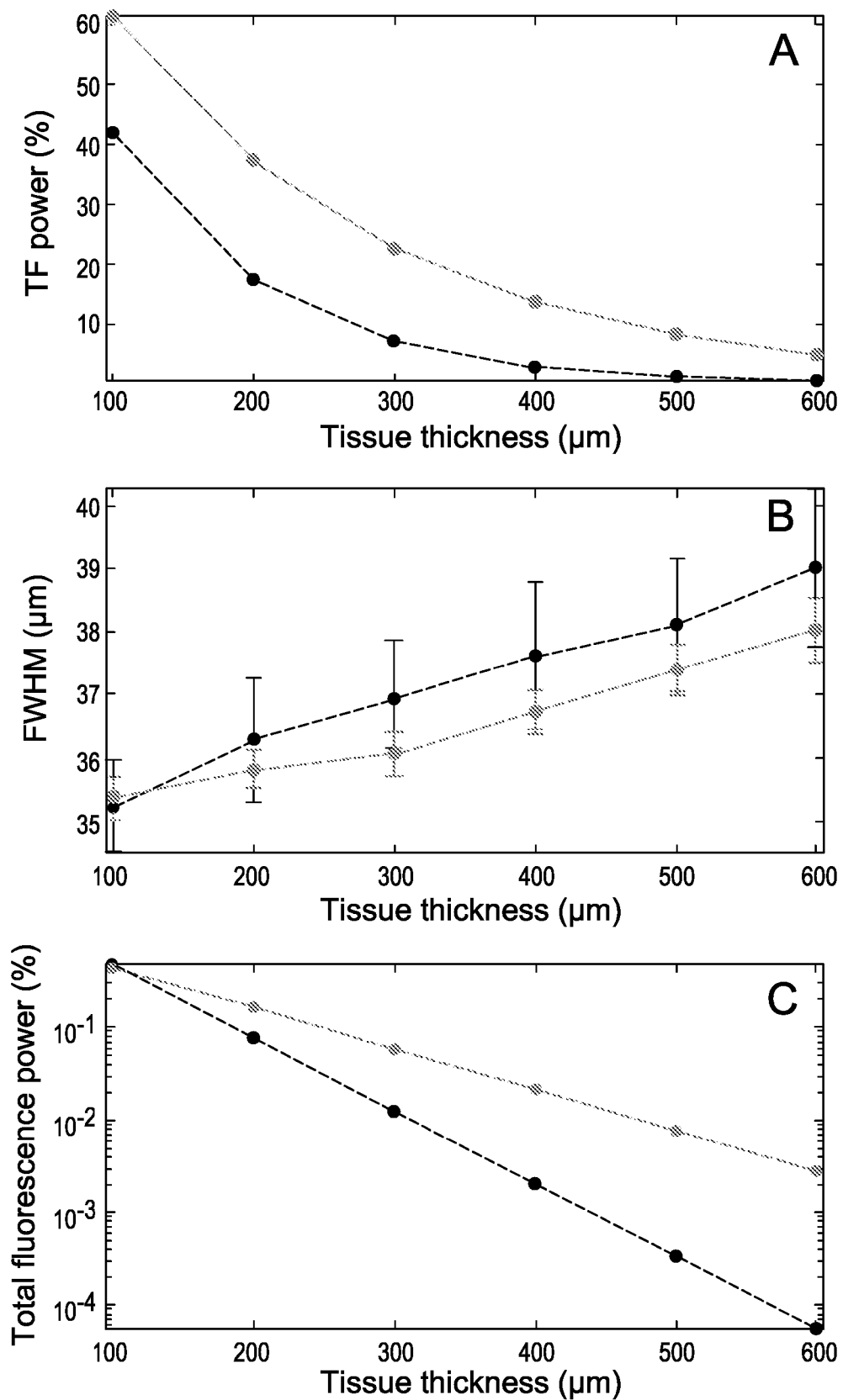
FIG. 8A shows the simulated total temporal focused laser power at the focal plane for different thicknesses of brain tissue for two-photon fluorescence excitation (lower, blue curve) and three-photon fluorescence excitation (upper, red curve)
FIG. 8B shows the full width at half maximum (FWHM) of a temporal focused Gaussian beam for different thicknesses of brain tissue for two-photon fluorescence excitation (upper, blue curve) and three-photon fluorescence excitation (lower, red curve)
FIG. 8C shows the total collected fluorescence power using a NA=0.8 objective for different thicknesses of brain tissue for two-photon fluorescence excitation (lower, blue curve) and three-photon fluorescence excitation (upper, red curve)

FIGS. 7 and 8 show the results of a one-dimensional simulation of the operation of the imaging system 2 of FIG. 1. The simulation takes into account the propagation of the different wavelengths or monochromatic portions of the pulse along different paths arising as a result of temporal focusing through the scattering medium 6 and the detection of the fluorescent light after passing a second time through the scattering medium 6.

FIGS. 7A and 7B show simulation results for the case where the laser pulse is centred at 800 nm for two-photon excitation when the laser pulse propagates through a scattering medium in the form of brain tissue with a thickness of 400 μm. FIGS. 7C and 7D show simulation results for the case where the laser pulse is centred at 1700 nm for three-photon excitation when the laser pulse propagates through a scattering medium in the form of brain tissue with a thickness of 400 μm.

FIG. 7A shows the dispersed Gaussian beams for two-photon excitation at the surface of the brain tissue (full width at half maximum (FWHM) is 35 μm). FIG. 7B shows the excitation beams with different wavelengths at the focal plane for two-photon excitation. The solid red curve in FIG. 7B shows the profile of the temporal focused beam after propagating through 400 μm of brain tissue. The simulation demonstrates that when monochromatic light propagates through a thick scattering layer such as a 400 μm thick brain slice, it turns into a speckle pattern as expected. However, one of the important features of temporal focusing is that each wavelength or monochromatic portion of the pulse, propagates through the scattering medium 6 with a slightly different angle resulting in speckle patterns that are highly correlated with each other. As a result, the overall beam profile can be remarkably well conserved as represented by the thick curve in FIG. 7B.

For the simulations of FIGS. 7A and 7B, a layer of turbid tissue is simulated by mixing an aqueous medium with randomly distributed dielectric spheres of 2 μm at a concentration of 1 sphere per 1000 μm$^3$. The refractive index of the scattering spheres is 0.1 higher than the surrounding media. Numerical simulations are carried out only in one dimension to reduce the required computation power. Similarly to the grating in the experiment, the spectral components in the laser pulse are dispersed and expanded to fill the back aperture of a microscope objective (NA=0.8) as shown in FIG. 7A. Assuming that the laser pulse contains 70 spectral components at different wavelengths with a step of 0.1 nm, each monochromatic component of the pulse propagates through a different region of scattering tissue and arrives at the same position on the focal plane using the split step approach implemented in Matlab. Back scattering is neglected here while the attenuation coefficient of turbid media is set to $4.45 \times 10^3$ m$^{-1}$, experimentally estimated by measuring the laser power before and after tissue samples. At the focal plane, each spectral component forms a speckle pattern as shown in FIG. 7B. These speckle patters are significantly spatially correlated but shifted from each other since each different wavelength travels a slightly different optical path through the turbid medium. As expected, temporally focusing these speckle patterns results in a distinct 'smooth' excitation beam at the focal plane as shown by the solid red curve in FIG. 7B. According to the numerical simulation results, the total power delivered through the tissue decreases exponentially with the thickness of tissue as shown in FIG. 8A. FIG. 8B also shows the beam's full width at half maximum (FWHM) at the TF plane increases slightly when the beam is focused through a thick layer which would result in a slight distortion of the Hadamard patterns projected in the experimental measurements. The excited fluorescent photons have to propagate through the turbid tissue before they can be collected by the same microscope objective and therefore the total fluorescence signal becomes very weak for a thick tissue layer compared to the initial illumination power as shown in FIG. 8C.

FIG. 7C shows the dispersed Gaussian beams for three-photon excitation at the surface of the brain tissue (full width at half maximum (FWHM) is 35 µm).

FIG. 7D shows the excitation beams with different wavelength at the focal plane for three-photon excitation. The solid red curve in FIG. 7D shows the profile of the temporal focused beam after propagating through 400 µm of brain tissue. The simulation demonstrates that when monochromatic light propagates through a thick scattering layer such as a 400 µm thick brain slice, it turns into a speckle pattern as expected. However, one of the important features of temporal focusing is that each wavelength or monochromatic portion of the pulse, propagates through the scattering medium 6 with a slightly different angle resulting in speckle patterns that are highly correlated with each other. As a result, the overall beam profile can be remarkably well conserved as represented by the thick curve in FIG. 7D.

Since the attenuation length at 1700 nm is almost doubled for the same brain tissue, the attenuation coefficient is set to $2.5 \times 10^3$ m$^{-1}$ for the simulations of FIGS. 7C and 7D. Assuming all other parameters are the same, three-photon TF beams show a better penetration through the layer of tissue. FIG. 7D shows that the overall smoothed out speckle pattern reaching the focal plane for three-photon excitation more closely resembles the initial Gaussian beams than the smoothed out speckle pattern for two-photon excitation of FIG. 7B. Additionally, thanks to using longer wavelengths, the amount of TF laser power reaching focus is considerably higher than in the previous case as shown in FIG. 8A. As the FWHM of the overall smoothed out beam is thinner (FIG. 8B), the shape of the illumination Hadamard patterns would be distorted by a smaller amount than in two-photon excitation. This, combined to the fact that its intensity is higher (FIG. 7D), would make three-photon TRAFIX capable of penetrating much deeper in biological tissue. For the same fluorescence signal level detection threshold, TRAFIX in the three-photon mode can penetrate nearly 1.5 times deeper into the tissue than in the two-photon mode.

FIG. 8A shows the total temporal focused laser power at the focal plane using a NA=0.8 objective for different thicknesses of brain tissue expressed as a percentage of the incident laser power. FIGS. 8B and 8C show the corresponding full width at half maximum of the temporal focused Gaussian beam and the total collected fluorescence power expressed as a percentage of the incident laser power respectively. From FIG. 8C and, considering the quantum efficiency of the detector, it is clear that the no information could be retrieved through brain tissue thicker than 500 µm.

Microscope Characterisation

Beam Profile

Figure 9:
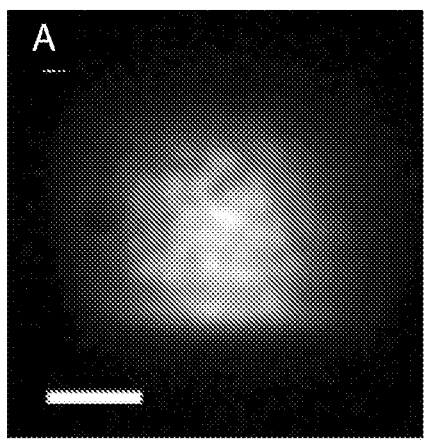
FIG. 9A shows a measured beam profile at the focal plane when using temporal focusing in the absence of any scattering medium using the multi-photon imaging system of FIG. 1.
FIG. 9B shows a measured beam profile at the focal plane when using temporal focusing through 900 μm of scattering phantom ($l_s$~250 μm) using the multi-photon imaging system of FIG. 1.
FIG. 9C shows a measured beam profile at the focal plane in the absence of any temporal focusing and in the absence of any scattering medium using the multi-photon imaging system of FIG. 1.
FIG. 9D shows a measured beam profile at the focal plane in the absence of any temporal focusing through 900 □ in the absence of any temI$_s$~250 µm) using the multi-photon imaging system of FIG. 1.
Figure 9:
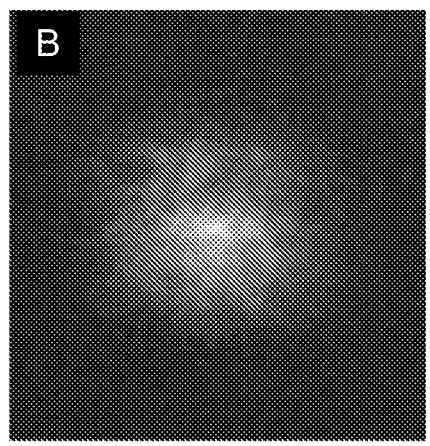
Figure 9:
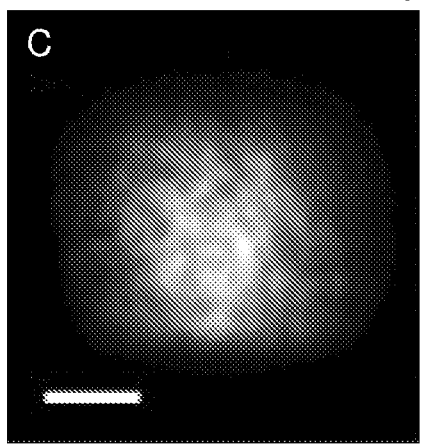
Figure 9:
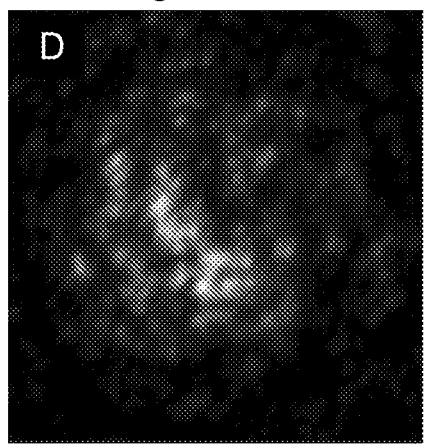

FIGS. 9A-9D show the effect of scattering on the beam profile with and without temporal focusing (TF). FIGS. 9A and 9B show the beam profile with, and FIGS. 9C and 9D without, TF. FIGS. 9A and 9C were taken without scattering and FIGS. 9B and 9D through 900 µm of scattering phantom ($l_s$~250 µm). Scale bar is 20 µm. These results show the resilience of TF to speckle formation after propagation through scattering media.

Axial Resolution

Figure 10:
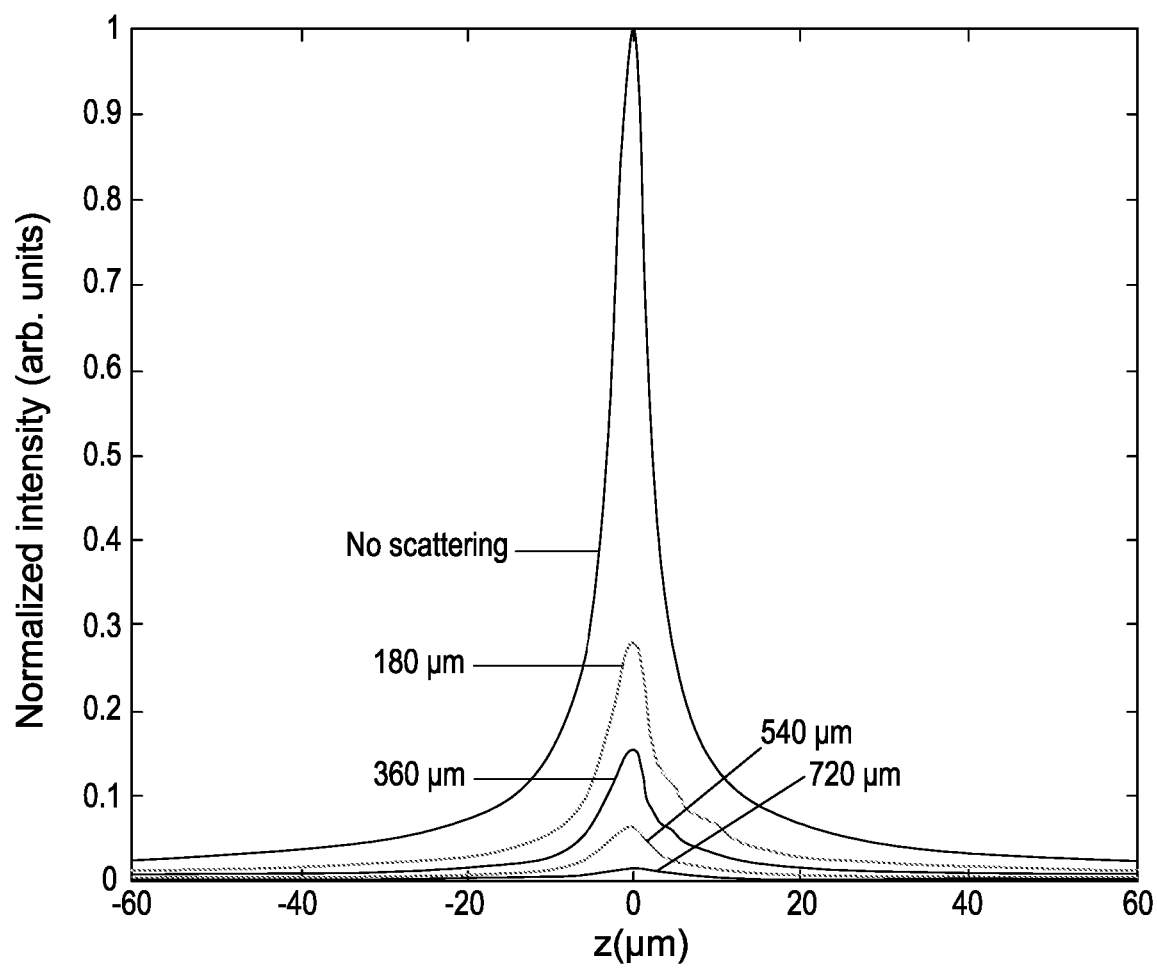
FIG. 10 shows a measured depth profile of a temporal focused beam at the focal plane after propagation through different thicknesses of scattering phantom (I$_s$~250 µm) using the multi-photon imaging system of FIG. 1.

FIG. 10 shows the depth profile of a TF beam through a scattering phantom. The axial extent of the illumination plane was measured through different thicknesses of scattering phantom ($l_s$~250 µm). The size at the FWHM determines the depth resolution of the microscope. The axial resolution without scattering is 4.7±0.5 µm. The objective used for this measurement was a Nikon 40× NA=0.8.

Figure 11:
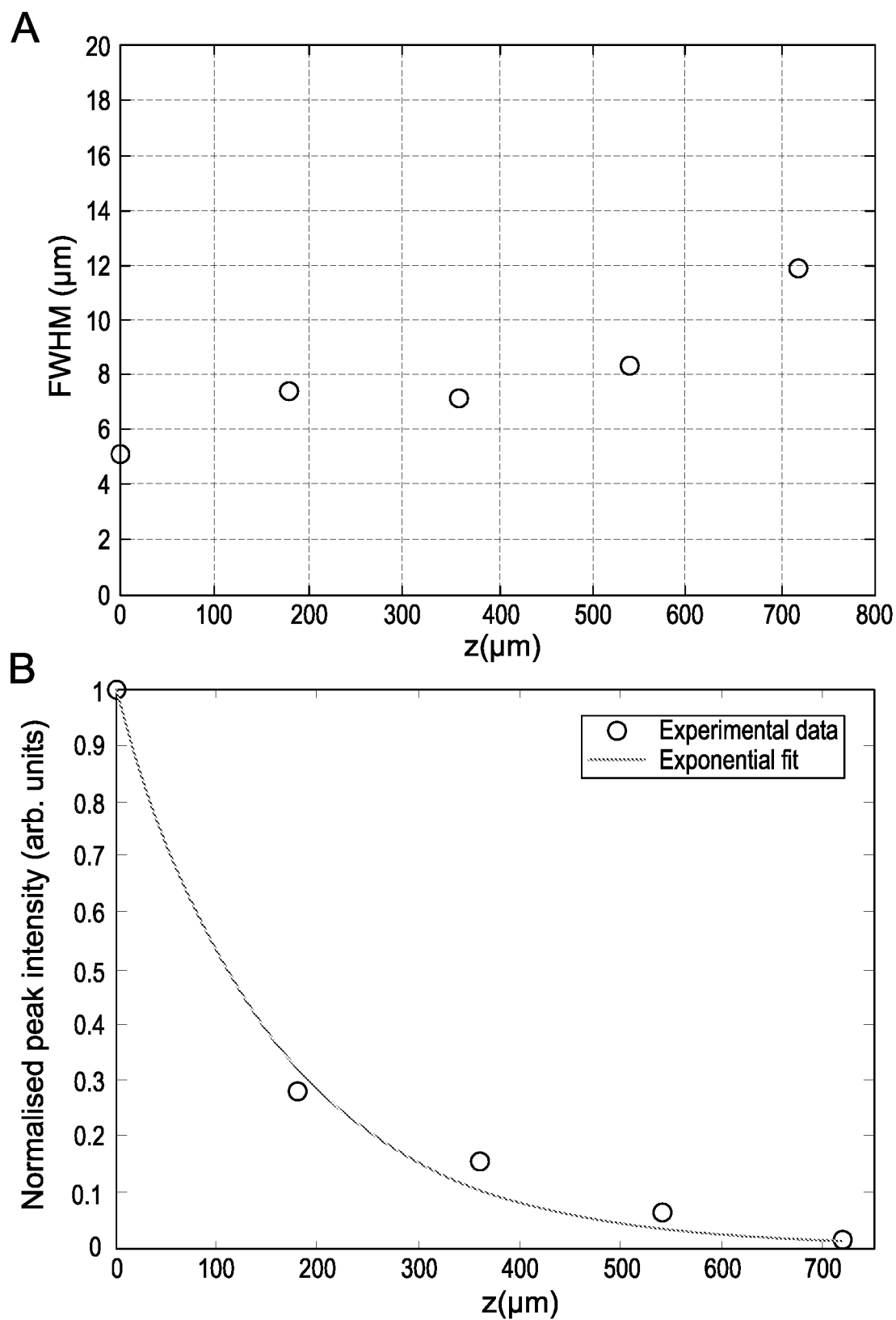
FIG. 11A shows the full-width at half maximum (FWHM) of the depth profiles of FIG. 10.
FIG. 11B shows the peak intensities of the depth profiles of FIG. 10.

FIGS. 11A and 11B show the results of the characterisation of a TF beam through a scattering phantom obtained from the data represented in FIG. 10. FIG. 11A shows the full width at half maximum (FWHM) of the depth profiles. The depth resolution decreases about 2.5 times after propagating through 720 µm of the scattering phantom ($l_s$~250 µm). FIG. 11B shows the peak intensity of the depth profiles. It decreases exponentially as light travels farther through the scattering medium. FIG. 11A shows that the depth resolution of TRAFIX deteriorates as the beam propagates deeper inside a turbid medium but it only decreases by a factor of 2.5 after propagating through more than 700 µm of the medium. In addition, the intensity of the light emitted by the excited plane drops exponentially (FIG. 11B).

Imaging without Scattering

Prior to imaging through turbid samples, the performance of the system 2 was tested without scattering. FIGS. 12A-12H show images of fluorescent microscopic samples without scattering. Fluorescent beads of 400 nm in diameter and fixed HEK293T/17-GFP cells were imaged without the presence of any scattering layer. FIGS. 12A and 12F show images taken from the reference imaging arm under uniform TF illumination across the FOV. Camera binning was set to 1, and exposure time was 5 s and 10 s, respectively. FIGS. 12B-12E and 12G-12H show Images obtained in epi-fluorescence configuration with TRAFIX using a Hadamard basis containing 4096 illumination patterns. They were reconstructed using different compression ratios corresponding to 100% (CR=1), 50% (CR=2), 25% (CR=4) or 12.5% (CR=8) of the total patterns. Each single measurement of the Hadamard scan was taken with a binning of 64 and an exposure time of 0.025 s and 0.02 s, respectively. The spacing between beads (Table 3) and the diameter of the cells (Table 2) were measured to assess image quality. The signal-to-background ratio (SBR) is shown for all reconstructed images. Scale bars are 10 µm. The images of FIGS.

12A-12H demonstrate that the image quality in the case of beads remains practically the same both visually and in terms of signal-to-background ratio (SBR) for all levels of compression. High CR could not be achieved for cell imaging mainly because images are not sparse enough.

Lateral Resolution Through Scattering

Figure 13:
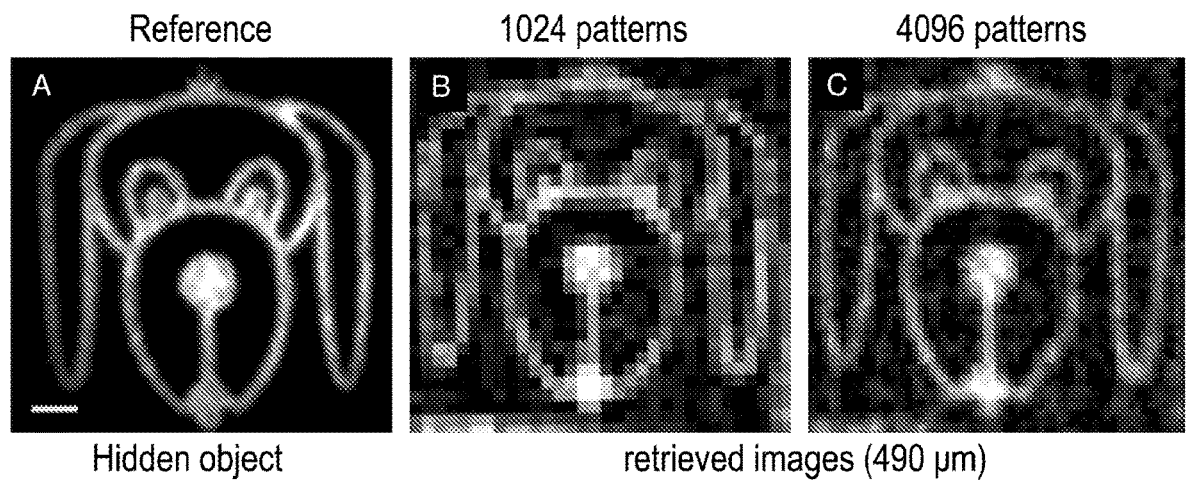
FIG. 13A shows a reference image of a hidden sample obtained without scattering using the reference transmission imaging system of FIG. 1.
FIG. 13B shows an image of the hidden sample obtained through a 490 µm scattering phantom using the multi-photon imaging system of FIG. 1 to perform TRAFIX using a full Hadamard basis containing 1024 patterns.
FIG. 13C shows an image of the hidden sample obtained through a 490 µm scattering phantom using the multi-photon imaging system of FIG. 1 to perform TRAFIX using a full Hadamard basis containing 4096 patterns.

FIGS. 13A-13C show a comparison of the hidden object and the retrieved images through a scattering phantom with different resolution. FIG. 13A shows a reference image of the fluorescent micropattern without any scattering sample. FIGS. 13B and 13C show reconstructed images obtained with TRAFIX in the epifluorescence configuration through 490 μm of scattering phantom. The two retrieved images were reconstructed using full Hadamard bases containing 1024 and 4096 patterns, respectively. The scale bar is 10 μm.

With a FOV of approximately 90×90 μm$^2$ and using a 32×32 pixel basis (1024 patterns), the lateral resolution is 5.6 μm; and using a 64×64 pixel basis (4096 patterns) it becomes 2.8 μm. The resolution can also be improved by making the FOV smaller using higher magnification optics.

Imaging Volumetric Fluorescent Samples

A scattering phantom with fluorophores extending its entire volume was imaged to determine the performance of TRAFIX in imaging in presence of intense out-of-focus fluorescent light. The phantom contained 0.4 μm and 4.8 μm diameter fluorescent beads, and 1 μm diameter polystyrene beads embedded in 1.5% agarose. The 0.4 μm fluorescent microparticles contribute to creating a fluorescent background and the 4.8 μm beads simulate features of interest. This experiment was done with a Nikon 20× NA=0.75 air objective.

Figure 14:
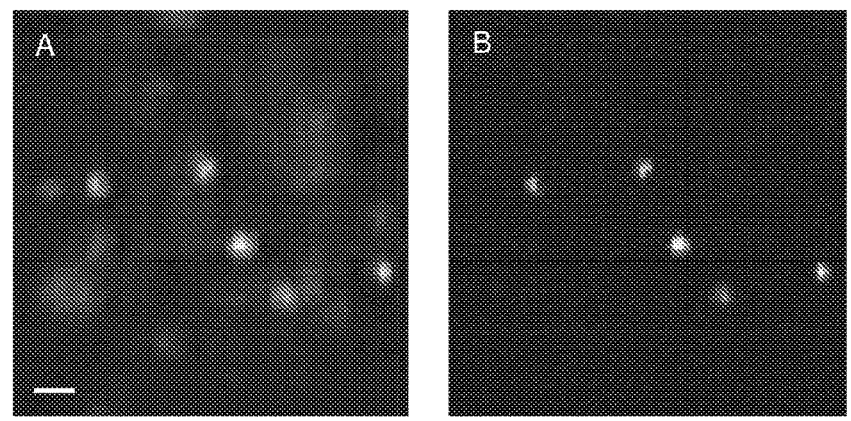
FIG. 14A shows an image of 4.8 µm diameter fluorescent beads obtained through a 300 µm thick scattering phantom having 0.4 µm diameter fluorescent beads embedded therein and using the multi-photon imaging system of FIG. 1 to perform TRAFIX.
FIG. 14B shows the image of FIG. 14A with grey levels adjusted to minimise background noise.

FIGS. 14A and 14B shows images of the phantom at a depth of ~300 μm. FIG. 14A shows an image taken at a depth of 300 μm with balanced gray levels. FIG. 14B shows the same image with gray levels adjusted to minimise background noise.

No reference images are shown because this is a three-dimensional sample and the imaged plane is not accessible from the reference imaging system. As the axial confinement of the TF illumination plane with the present objective at a depth of ~300 μm is ~20 μm, 4.8 μm beads out of the focal plane generate a strong fluorescent background. However, beads located at the focal plane can still be clearly distinguished by simply adjusting the gray levels of the image. Axial resolution can be enhanced by changing imaging parameters such as magnification, NA or pulse duration, or by relaying on line-scanning TF illumination instead of wide-field.

Comparison Between TRAFIX and Point-Scanning Two-Photon Microscopy (2 PM)

Signal-to-Background Ratio (SBR) at Depth

To compare the performance of TRAFIX and point-scanning 2 PM imaging methods at depth, two different point-scanning 2 PM experiments were carried out. Each experiment involved imaging fluorescent micropatterns at different depths through a scattering phantom ($I_s$~100 μm) and comparing the signal-to-background ratio (SBR) of the acquired images. An underfilled Nikon 20× NA=0.75 air objective was used for the studies below to equate lateral and axial resolution for both approaches. One of skill in the art will understand that for point-scanning 2 PM imaging, the diffraction grating 16 and the lens 17 of the TRAFIX imaging system 2 of FIG. 1 were replaced with a mirror and the illumination was uniform i.e. the spatial light modulator 14 reflected or diffracted the beam 42 without imposing any spatial modulation on the reflected light. Also, point-scanning was achieved by translating the sample 4 and the scattering medium 6 relative to the illumination using a translation stage or by keeping the sample 4 stationary and employing one or more beam scanning mirrors (e.g. one or more galvanometer-based scanning mirrors) to scan the illumination relative to the sample 4.

Experiment 1: Comparable Lateral Resolution

Firstly, the back aperture of the objective was filled so as to produce a focused spot of 3.75 μm diameter to make it similar to the lateral resolution of TRAFIX (FOV of 84×84 μm$^2$ using an illumination basis size of 1024). We term this 2 PM-Lateral.

Experiment 2: Comparable Axial Resolution

Here, the NA of the illumination beam was increased to improve the axial resolution of 2 PM to 8.4 μm, which was the same as for TRAFIX. We term this 2-PM-Axial.

The laser power was set to the maximum for TRAFIX, obtaining a power per unit area and pattern on the sample of 0.068 mW/μm$^2$·pattern. The total accumulated power per unit area after a measurement with the full basis was 69 mW/μm$^2$. The laser power per unit area was then adjusted to generate approximately the same fluorescence intensity in 2 PM as the total fluorescence intensity generated by TRAFIX after 1024 patterned illuminations. This was 2.2 mW/μm$^2$. The exposure time of the camera was set to the same value for each pixel in 2 PM scan as for each TRAFIX pattern to make the experiment fully comparable.

Figure 15:
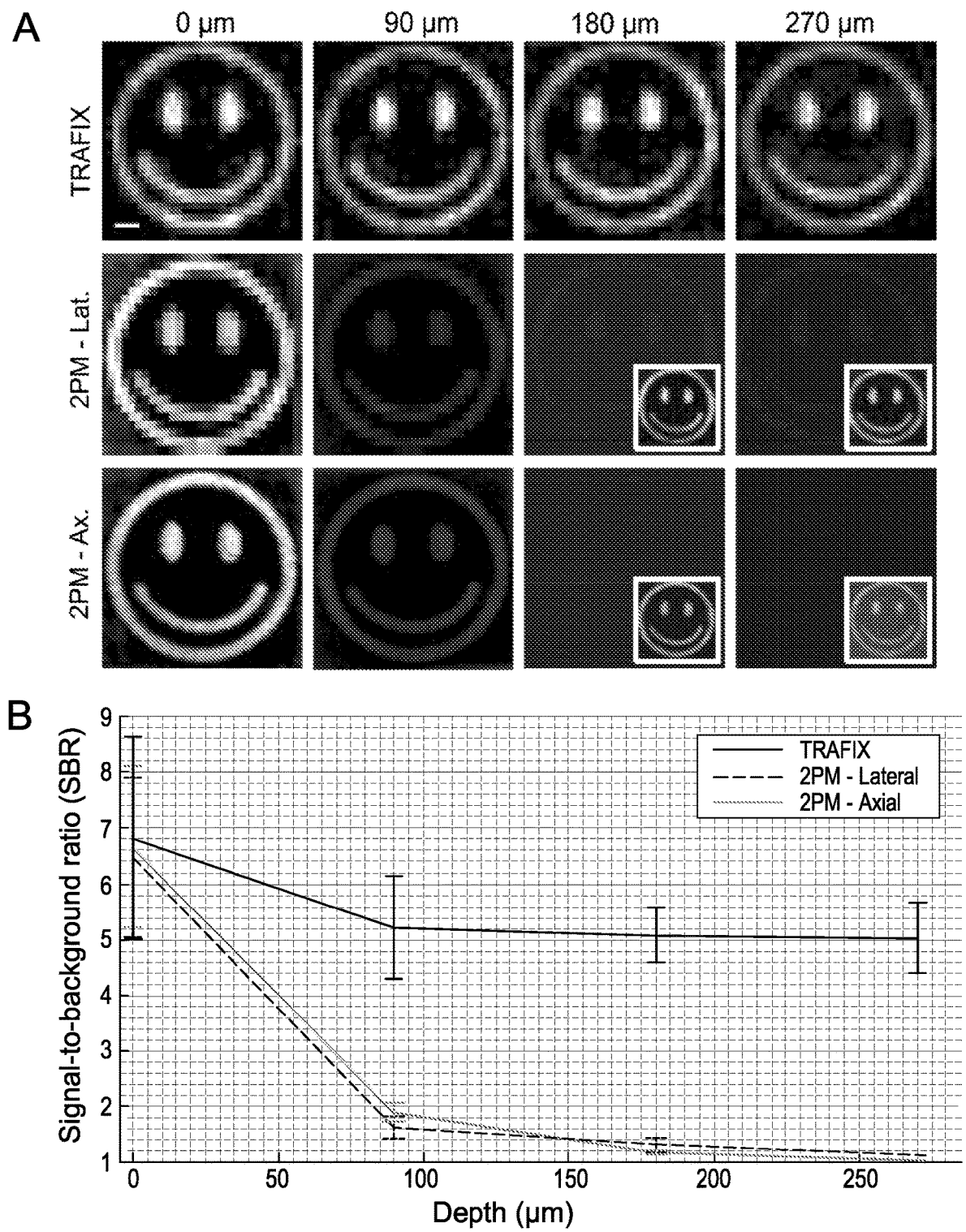
FIG. 15A images of fluorescent micropatterns obtained with TRAFIX and point-scanning two-photon microscopy (2 PM) through scattering phantoms of different thicknesses.
FIG. 15B values of signal-to-background ratio (SBR) for TRAFIX and 2 PM through scattering phantoms of different thicknesses.

The results for both experiments are shown together in FIGS. 15A and 15B. All images were obtained with different micropatterns (smiley faces) to avoid the effect of photobleaching in the SBR calculation. FIG. 15A shows images of fluorescent micropatterns obtained with TRAFIX and 2 PM through scattering phantoms of different thicknesses. 2 PM-Lateral has approximately the same lateral resolution as TRAFIX and 2 PM-Axial has similar axial confinement as TRAFIX. Small insets show the same image with different gray values. Laser power per unit area per TRAFIX pattern was 0.068 mW/μm$^2$·pattern and the total accumulated laser power per unit area after a full measurement with 1024 patterns was 69 mW/μm$^2$. Laser power per unit area for 2 PM was 2.2 mW/μm$^2$. Camera binning and exposure time were maintained constant for all measurements at the same depth. Exposure time per TRAFIX pattern was the same as per pixel in 2 PM. Images were acquired with an underfilled 20× NA=0.75 objective. Scale bar is 10 μm. FIG. 15B shows the values of SBR at different depths for TRAFIX and 2 PM. The scattering mean free path of the phantom is $I_s$~100 μm. As expected, in the experiments without scattering, the SBR was equivalent for both TRAFIX and 2 PM. The SBR in 2 PM degrades more rapidly than for TRAFIX when imaging at depth.

Figure 16:
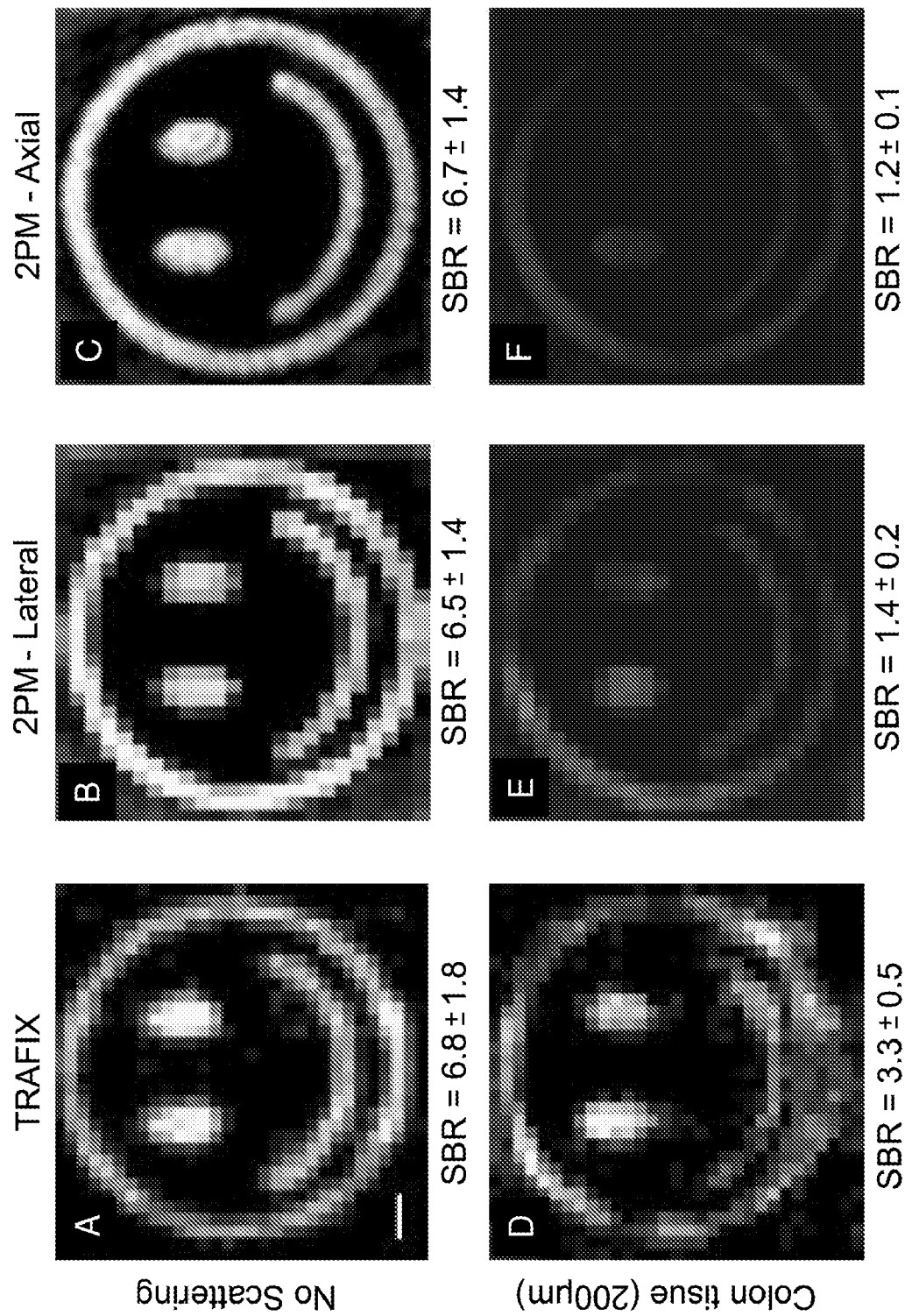
FIG. 16A image of fluorescent micropattern obtained with TRAFIX in the absence of any scattering.
FIG. 16B image of fluorescent micropattern obtained with 2 PM having approximately the same lateral resolution as TRAFIX in the absence of any scattering.
FIG. 16C image of fluorescent micropattern obtained with 2 PM having approximately the same axial confinement as TRAFIX in the absence of any scattering.
FIG. 16D image of fluorescent micropattern obtained with TRAFIX through 200 µm of human colon tissue.
FIG. 16E image of fluorescent micropattern obtained with 2 PM having approximately the same lateral resolution as TRAFIX through 200 µm of human colon tissue.
FIG. 16F image of fluorescent micropattern obtained with 2 PM having approximately the same axial confinement as TRAFIX through 200 µm of human colon tissue.

Furthermore, we also performed these two experiments in exactly the same conditions through 200 μm of unfixed human colon tissue. FIGS. 16A-16F provide a comparison of the results. FIGS. 16A-16C show images of a fluorescent micropattern obtained with TRAFIX and 2 PM without scattering. 2 PM-Lateral has approximately the same lateral resolution as TRAFIX and 2 PM-Axial has similar axial confinement as TRAFIX. FIGS. 16D-16F show images obtained through 200 μm of unfixed human colon tissue. Laser power per unit area per TRAFIX pattern was 0.068 mW/μm$^2$·pattern and the total accumulated laser power per unit area after a full measurement with 1024 patterns was 69 mW/μm$^2$. Laser power per unit area for 2 PM was 2.2 mW/µm². Camera binning and exposure time were maintained constant for FIGS. 16A-16C and FIGS. 16D-16F. Exposure time per TRAFIX pattern was the same as per pixel in 2 PM. Signal-to-background ratio (SBR) is shown for all images. Images were taken with an underfilled 20× NA=0.75 objective. The scale bar is 10 µm.

FIGS. 16A-16F also show a higher SBR for TRAFIX at depth. These results show that TRAFIX achieves between 2 and 5 times higher SBR than 2 PM for the samples and depths considered in this study. As described in the article, this is due to the resilience of TF beams to speckle formation and the fact that the temporal profile of femtosecond pulses is distorted to a lower extent compared to the spatial profile.

Axial Confinement

Figure 17:
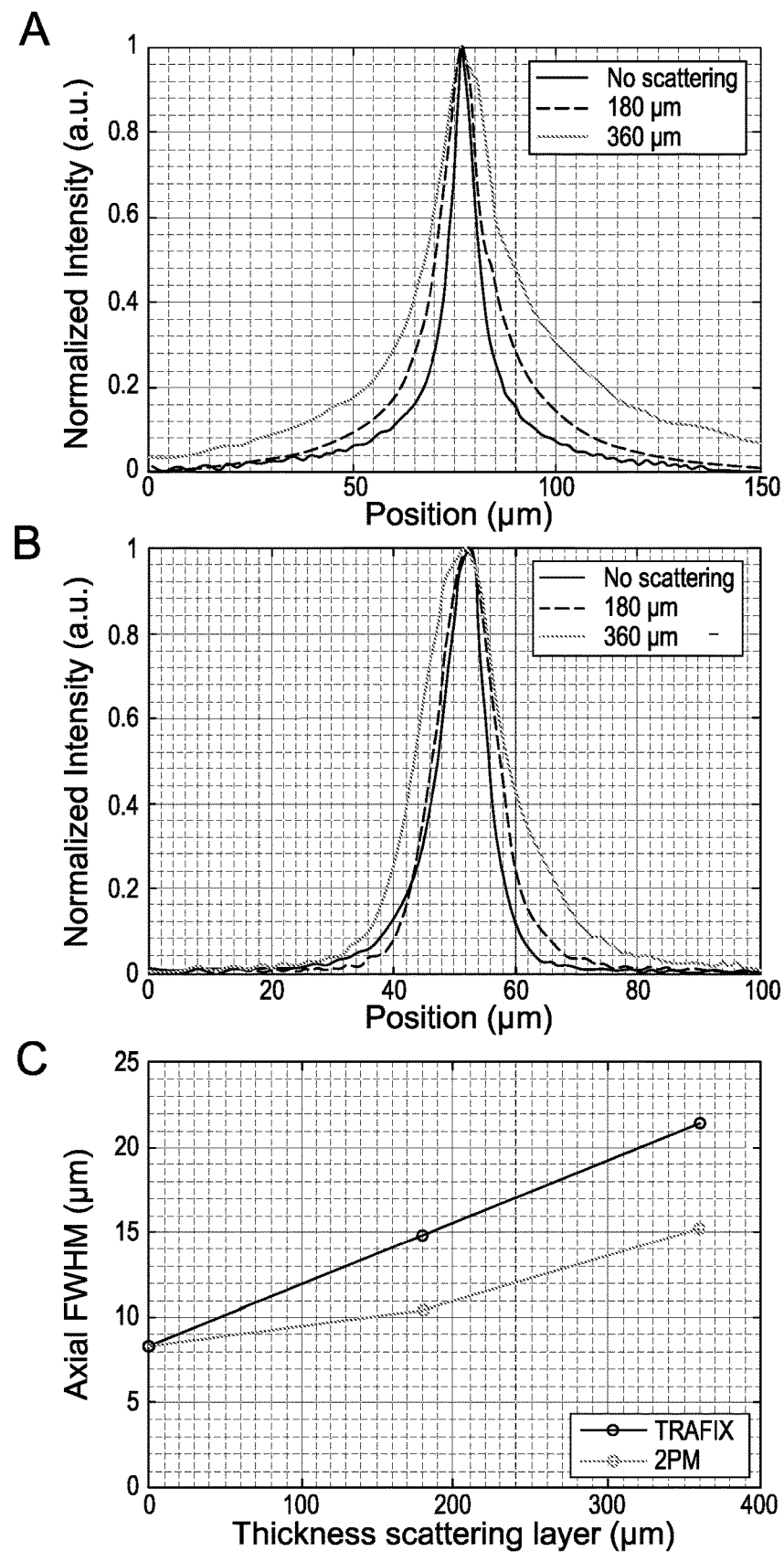
FIG. 17A axial profile of a uniform temporal focused 84×84 µm square through various layers of scattering phantom (I$_s$~150 µm)
FIG. 17B axial profile of a spatially focused 1.26 µm diameter spot through various layers of scattering phantom (I$_s$~150 µm)
FIG. 17C full width at half maximum (FWHM) of the depth profile for TRAFIX and 2 PM as a function of thickness of scattering phantom (I$_s$~150 µm)

FIGS. 17A-17C compare the axial confinement of TRAFIX and 2 PM through different layers of a scattering phantom having a scattering mean free path of $I_s$~150 µm and using a Nikon 20× NA=0.75 objective. FIG. 17A shows an axial profile of a uniform TF 84×84 µm square. FIG. 17B shows an axial profile of a spatially focused 1.26 µm diameter spot through various layers of scattering phantom. $I_s$~150 µm. FIG. 17C shows the full width at half maximum (FWHM) of the depth profile for TRAFIX and 2 PM through scattering phantoms. The objective used in this experiment was a Nikon 20× NA=0.75. objective.

Starting from the same axial confinement without scattering, FIGS. 17A-17C show that TRAFIX (or equivalently, wide-field TF) degrades faster than 2 PM. The axial extent of the illuminated plane in TRAFIX increases ~2.6 times after ~2.4 scattering mean-free-path lengths while in 2 PM it only increases by ~1.8 times. It is also worth remarking that 2 PM has better axial confinement than TRAFIX because it is currently based on wide-field TF illumination. To achieve the same axial confinement as 2 PM, fast line-scanning TF illumination should be used to create the illumination patterns in TRAFIX.

Photobleaching

When imaging biological samples, photobleaching and photodamage caused by the high irradiation intensities of the illuminating light need to be carefully considered. The wide-field temporal focusing nature of TRAFIX avoids the need of spatially focusing a laser beam on the sample resulting in a reduced illumination power per unit area.

The use of patterned illumination is also beneficial for imaging sensitive biological samples since the total illumination energy is distributed over many low intensity exposures. Even though the total accumulated power per unit area in TRAFIX may be higher than in 2 PM, it has been shown that by delivering the same total light dosage in a sequential rather than instantaneous manner, photobleaching and photodamage are drastically reduced.

To verify this, we performed an experiment in which we sequentially imaged two fluorescent micropatterns without scattering with TRAFIX and with 2 PM. The illumination power per unit area of TRAFIX was set to 0.034 mW/µm² pattern and the resulting accumulated power per unit area after projecting 1024 patterns was 35 mW/µm². We determined that in order to have the same total fluorescence count (i.e. equivalent image quality) the laser power per unit area of 2 PM in this case should be 1.1 mW/µm². We observed that under this power per unit area, the fluorescent micropattern was severely damaged so we decided to perform this experiment with half of that power, i.e. 0.55 mW/µm².

Figure 18:
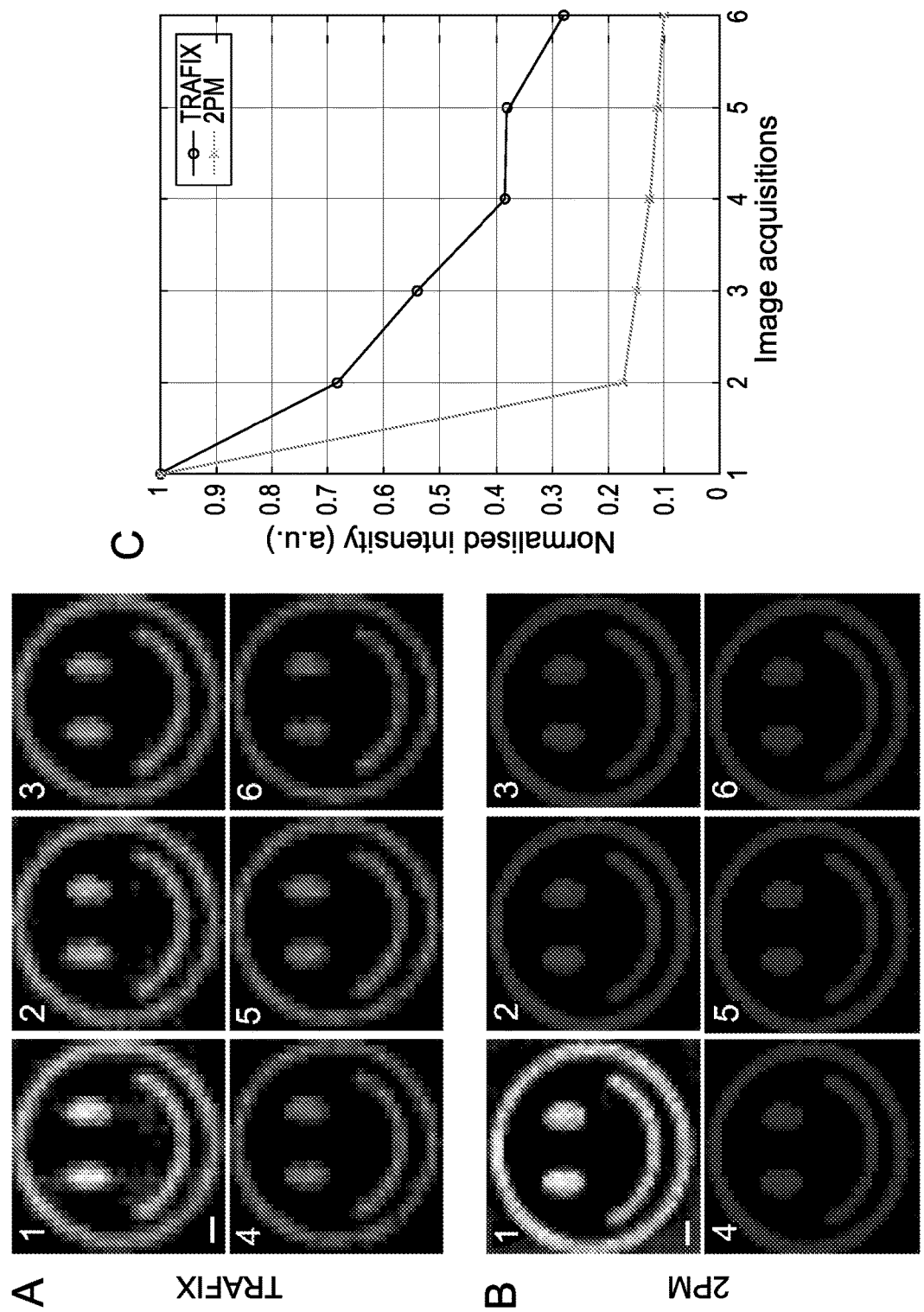
FIG. 18A successive images of fluorescent micropattern obtained with TRAFIX in the absence of any scattering for a comparison of photobleaching.
FIG. 18B successive images of fluorescent micropattern obtained with 2 PM in the absence of any scattering for a comparison of photobleaching.
FIG. 18C fluorescence intensity decay after several acquisitions for TRAFIX and 2 PM.

FIGS. 18A-18C compare photobleaching of TRAFIX and point-scanning two-photon microscopy (2 PM). FIG. 18A shows successive images obtained with TRAFIX without scattering. FIG. 18A shows successive images obtained with 2 PM without scattering. Laser power per unit area for TRAFIX is 0.034 mW/µm² and the resulting accumulated power per unit area after projecting 1024 patterns is 35 mW/µm². The laser power per unit area for 2 PM is 0.55 mW/µm², which corresponds to half of the required power per unit area to generate the same total fluorescence signal as TRAFIX. Images taken with an underfilled 20× NA=0.75 objective. FIG. 18C shows the fluorescence intensity decay after several acquisitions for TRAFIX and 2 PM.

It is clear to see that the image quality of 2 PM degrades much faster than that of TRAFIX even under lower laser power per unit area than required to obtain the same SBR. Under more favourable conditions compared to TRAFIX, 2 PM photobleaching is still over three times higher. Thus, this highlights a further major advantage of the TRAFIX approach.

Effect of Scattering on Excitation Beams

A further experiment was performed to determine the effect of scattering on the illumination patterns of TRAFIX and 2 PM. A fluorescent layer placed on top of the colon tissue was illuminated with various TRAFIX patterns and the 2 PM focused beam, and imaged from the reference arm.

Figure 19:
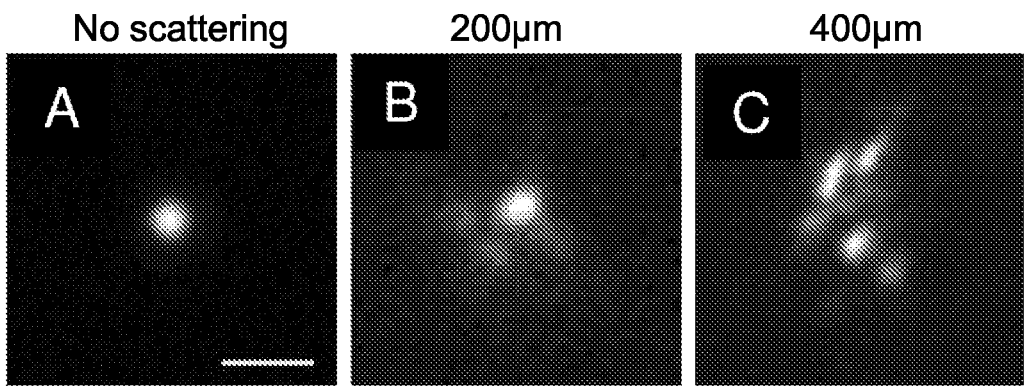
FIG. 19A illumination pattern in the focal plane for a 4 µm diameter focused beam when using point-scanning 2 PM in the absence of scattering.
FIG. 19B illumination pattern in the focal plane for a 4 µm diameter focused beam when using point-scanning 2 PM through 200 µm of unfixed colon tissue.
FIG. 19C illumination pattern in the focal plane for a 4 µm diameter focused beam when using point-scanning 2 PM through 400 µm of unfixed colon tissue.
FIG. 19D illumination pattern in the focal plane for a first Hadamard pattern when using TRAFIX in the absence of scattering.
FIG. 19E illumination pattern in the focal plane for the first Hadamard pattern when using TRAFIX through 200 µm of unfixed colon tissue.
FIG. 19F illumination pattern in the focal plane for the first Hadamard pattern when using TRAFIX through 400 µm of unfixed colon tissue.
FIG. 19G illumination pattern in the focal plane for a second Hadamard pattern when using TRAFIX in the absence of scattering.
FIG. 19H illumination pattern in the focal plane for the second Hadamard pattern when using TRAFIX through 200 µm of unfixed colon tissue.
FIG. 19I illumination pattern in the focal plane for the second Hadamard pattern when using TRAFIX through 400 µm of unfixed colon tissue.
FIG. 19J illumination pattern in the focal plane for a third Hadamard pattern when using TRAFIX in the absence of scattering.
FIG. 19K illumination pattern in the focal plane for the third Hadamard pattern when using TRAFIX through 200 µm of unfixed colon tissue.
FIG. 19L illumination pattern in the focal plane for the third Hadamard pattern when using TRAFIX through 400 µm of unfixed colon tissue.
Figure 19:
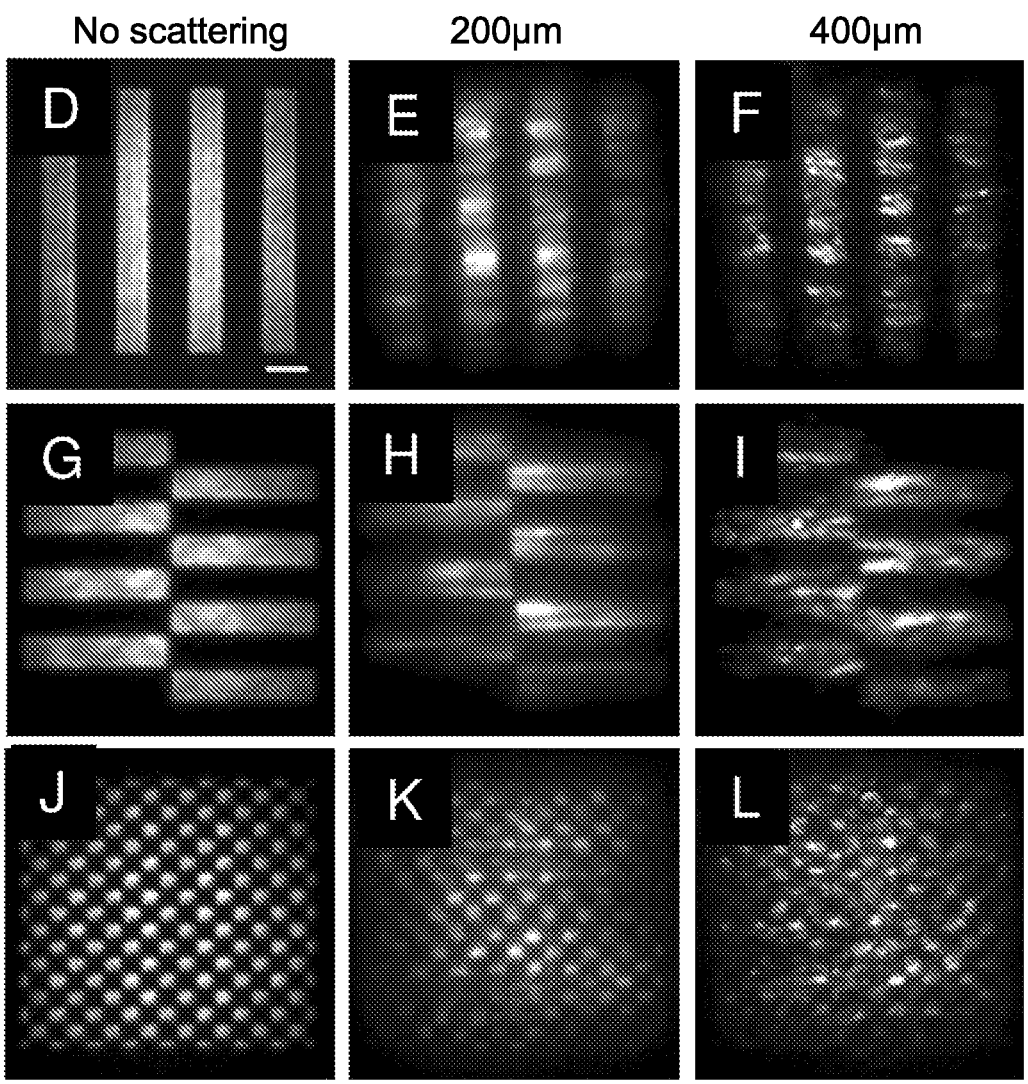

FIGS. 19A-19L show the effect of scattering on illumination beams in point-scanning two-photon microscopy (2 PM) and TRAFIX. The three columns correspond to the illumination patterns without scattering, through 200 µm and 400 µm of unfixed colon tissue, respectively. FIGS. 19A-19C are illumination pattern in the form of a 4 µm diameter focused beam used for 2 PM. FIGS. 19D-19L are Hadamard patterns of different orientation and spatial frequencies used for TRAFIX. The size of the patterns is 130×130 µm². Scale bars are 10 µm in FIG. 19A and 20 µm in FIG. 19D. This experiment was done with a 40× NA=0.8 objective. It can be seen that the 2 PM focused spot turns into a speckle pattern after ~400 µm while low frequency Hadamard patterns remain relatively well conserved though with important brightness inhomogeneities.

Polarisation State Evaluation

A scattering phantom and rat brain tissue were illuminated with linearly polarised light, and the polarisation state of the transmitted light was analyzed using a linear polariser and a power meter. The degree of linear polarisation (DOLP) defined as DOLP=$(I_\parallel-I_\perp)/(I_\parallel+I_\perp)$ was measured in all three cases obtaining 0.999 for the incident light, and 0.978 and 0.964 for the transmitted light through the scattering phantom and rat brain tissue, respectively.

Figure 20:
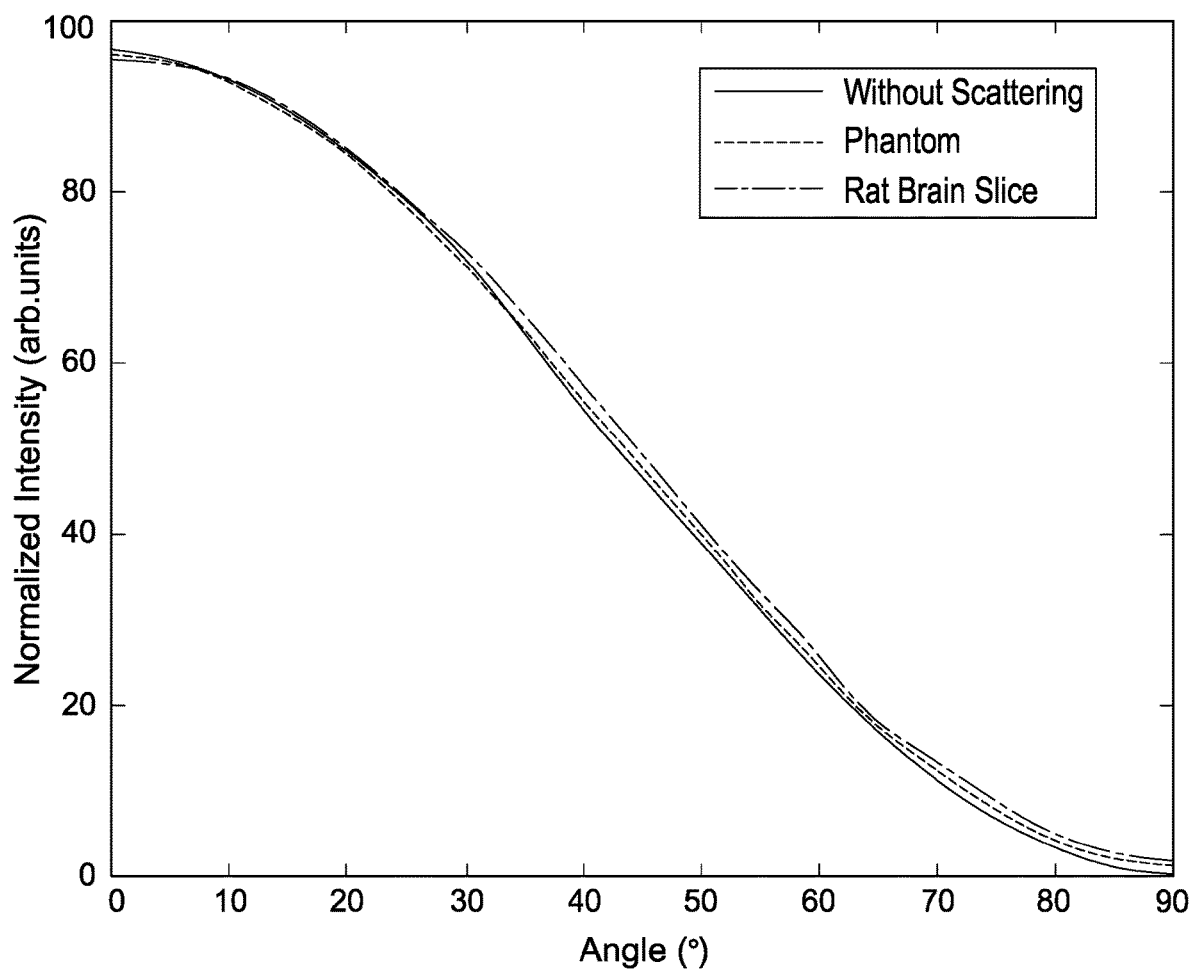
FIG. 20 intensity versus linear polariser angle after propagation of linearly polarised illumination light in the absence of scattering, through 640 µm of scattering phantom and 400 µm of rat brain tissue.

FIG. 20 shows the effect of turbid media on light polarisation. Linearly polarised illumination light retains its polarisation state through propagation in the scattering phantom or rat brain tissue used in this experiment. The data clearly obeys Malus' Law. The thickness of the scattering phantom and the rat brain tissue were 640 µm and 400 µm, respectively. In FIG. 20, intensity was normalised taking into account the transmittance of the different samples and the polariser. The results of FIG. 20 confirm that the polarisation state of light remains practically unchanged after propagating through the samples used in this investigation.

Alternative Embodiment

Figure 21:
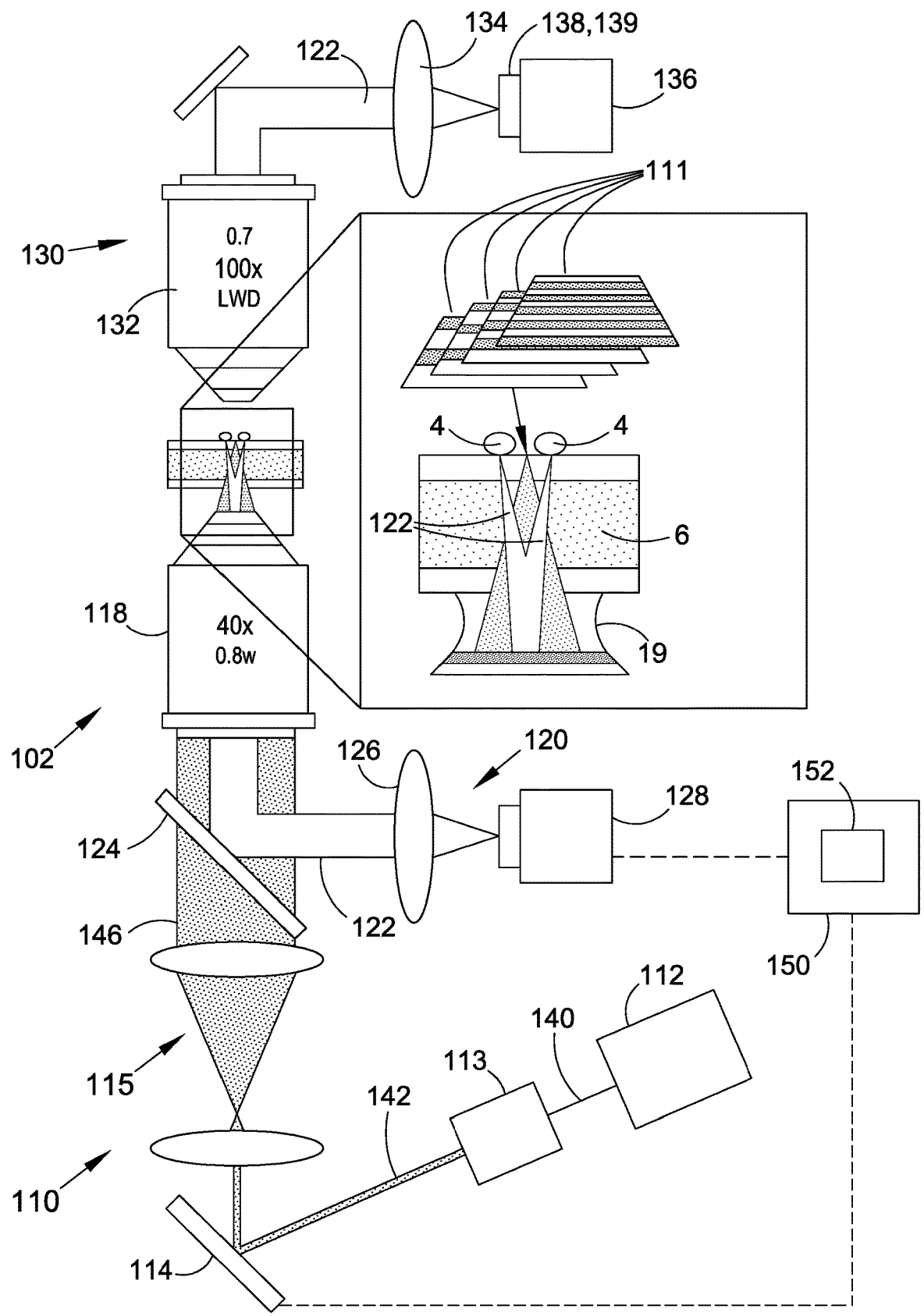
FIG. 21 shows an alternative multi-photon imaging system and an alternative reference transmission imaging system.

FIG. 21 shows an alternative imaging system generally designated 102 for use in multi-photon fluorescence excitation microscopy of a fluorescent sample 4 through a scattering medium 6. The alternative imaging system 102 of FIG. 21 is similar in many respects to the imaging system to FIG. 1 except that the alternative imaging system 102 of FIG. 21 does not rely upon the use of temporal focusing. The alternative imaging system 102 includes many features which correspond to features of the imaging system 2 of FIG. 1, with like features of the alternative imaging system 102 of FIG. 21 having the same reference numerals as the corresponding features of the imaging system 2 of FIG. 1 incremented by "100".

The imaging system 102 includes an illumination arrangement generally designated 110 for illuminating the fluorescent sample 4 through the scattering medium 6 with a plurality of spatial patterns 111 of incident electromagnetic radiation for the multi-photon excitation of the fluorescent sample 4. The plurality of spatial patterns 111 comprises an orthonormal basis set in the form of a set of Hadamard radiation patterns.

The imaging system 102 further includes a detection arrangement generally designated 120 for measuring, for each spatial pattern 111 of incident electromagnetic radiation, emitted electromagnetic radiation in the form of fluorescence 122 generated by the fluorescent sample 4 as a result of the multi-photon excitation of the fluorescent sample 4.

As will be appreciated by one of ordinary skill in the art, the imaging system 102 is arranged in an epi-fluorescence configuration wherein the illumination arrangement 110 is configured to illuminate one side of the fluorescent sample 4 (i.e. the underside of the fluorescent sample 4 in FIG. 21) through the scattering medium 6 and the detection arrangement 120 is configured to measure fluorescence 122 which is generated in the fluorescent sample 4 and emitted from same side of the fluorescent sample 4 (i.e. the underside of the fluorescent sample 4 in FIG. 21) through the scattering medium 6.

As shown in FIG. 21, the illumination arrangement 110 includes a source of incident electromagnetic radiation in the form of a laser 112 (Coherent Chameleon Ultra II), a beam expansion arrangement 113, a spatial light modulator ((Hamamatsu LCOS-SLM) 114, and a telescope 115. The illumination arrangement 110 further includes an illumination objective 118 (40× Nikon NA=0.8 water dipping objective). The fluorescent sample 4, the scattering medium 6 and the end of the illumination objective 118 adjacent to the scattering medium 6 are enclosed in a custom-made chamber (not shown) filled with water 19.

The detection arrangement 120 includes the same objective 118 used for illumination of the fluorescent sample 4, a dichroic mirror 124, a focusing lens 126, and an image sensor in the form of an electron multiplying CCD (EMCCD) camera (Andor iXon 885) 128. The EMCCD camera 128 is configured to operate as a bucket detector e.g. using 64×64 binning.

The imaging system 102 further includes a controller 150 which includes a processing resource 152. As illustrated by the dashed lines in FIG. 7, the controller 150 is configured for communication with the SLM 114 and the EMCCD camera 128. Specifically, the controller 150 is configured to receive a signal from the EMCCD camera 128 which is representative of the total fluorescence 122 detected by the EMCCD camera 128 for each spatial pattern 111 of incident electromagnetic radiation used to illuminate the fluorescent sample 4. The controller 150 is also configured to control the SLM 114 so as to generate the spatial patterns 111 of incident electromagnetic radiation in the focal plane or volume of the illumination objective 118.

Also shown in FIG. 21 is a reference transmission imaging system generally designated 130. One of ordinary skill in the art will understand that the reference transmission imaging system 130 does not form part of the imaging system 102. Nor is the reference transmission imaging system 130 required to provide an image of the fluorescent sample 4. Instead, the reference transmission imaging system 130 is used only for verifying the operation of the imaging system 102. The reference transmission imaging system 130 includes a long working distance 100× Mitutoyo NA=0.7 air objective 132 for collecting fluorescence 122 generated in the fluorescent sample 4 and emitted from the side of the fluorescent sample 4 opposite to the illuminated side of the fluorescent sample 4 (i.e. emitted from the upper side of the fluorescent sample 4 in FIG. 21), a focusing lens 134, and a CCD camera (Andor Clara) 136.

The reference transmission imaging system 130 includes one or more short pass filters 138 for rejecting excitation light at the wavelength of the laser 112 and for transmitting fluorescence below 700 nm. The reference transmission imaging system 130 also includes an iris 139 for minimising an auto-fluorescence signal emerging from biological samples. The iris 139 effectively acts as a "confocal-type" arrangement to help limit out-of-focus light. One of ordinary skill in the art will understand that although the one or more short pass filters 138 and the iris 139 are shown in FIG. 21 mounted at front of the CCD camera 136, the one or more short pass filters 138 and the iris 139 may be located anywhere between the air objective 132 and the CCD camera 136.

One of ordinary skill in the art will also understand that the objectives 118, 132, the sample 4, the scattering medium 6 and the CCD cameras 128, 136 may be mounted on the body of a microscope of any kind (e.g. an inverted commercial microscope such as a NIKON Eclipse Ti-S).

In use, the laser 112 delivers a laser beam 140 of optical pulses, each pulse having a duration of less than 1 ps, for example 100-200 fs or 140 fs, at a variable central wavelength between 680 nm and 1080 nm. The centre wavelength selected depends upon the field of use. For biomedical imaging the centre wavelength may be selected so as to fall within the therapeutic window (i.e. typically from around 700 nm-1100 nm) to avoid damage to the sample 4. The beam expansion arrangement 113 expands the laser beam 140 by a factor of four to provide an expanded beam 142 which covers an active area of the SLM 114. The telescope 115 expands the beam reflected from the SLM 114 and images the expanded beam 146 onto the back focal aperture of the illumination objective 118. The first diffraction order from the SLM 114 is transmitted through an iris in the telescope 115 while all other orders are blocked. The illumination objective 118 focuses the expanded beam 146 to a focal plane or focal volume which intersects and/or is located in the fluorescent sample 4.

The illumination objective 118 collects a portion of the fluorescence 122 generated in the fluorescent sample 4 for each spatial pattern 111 of incident electromagnetic radiation. The collected portion of the fluorescence 122 is then coupled via the dichroic mirror 124 and the focusing lens 126 to the EMCCD camera 128 which measures, for each spatial pattern 111 of incident electromagnetic radiation, the portion of the fluorescence 122 generated by the fluorescent sample 4 as a result of the multi-photon excitation of the fluorescent sample 4. It should be understood that although the EMCCD camera 128 includes a plurality of the pixels, the EMCCD camera 128 is configured to measure the total fluorescence 122 incident on the plurality of the pixels or the total fluorescence 122 incident on a subset of the plurality of the pixels for each spatial pattern 111 of electromagnetic radiation used to illuminate the fluorescent sample 4. In other words, the EMCCD camera 128 does not distinguish between the fluorescence 122 incident on different pixels and does not measure the spatial distribution of the fluorescence 122 incident upon the EMCCD camera 128. As such, the EMCCD camera 128 effectively operates as a single pixel detector.

The processing resource 152 of the controller 150 then uses the measured total fluorescence 122 for each spatial pattern 111 of incident electromagnetic radiation to determine an image of the fluorescent sample 4 with no a priori knowledge of the fluorescent sample 4 or the scattering medium 6 i.e. without any aberration correction for scattering in the fluorescent sample 4 or in the scattering medium 6. Specifically, the processing resource 152 of the controller 150 constructs an image of the fluorescent sample 4 from knowledge of each Hadamard spatial pattern 111 and the corresponding total fluorescence 122 measured by the EMCCD camera 128 using an image construction algorithm in the form of an orthogonal matching pursuit algorithm.

As described above in relation to the imaging system 2 of FIG. 1, the reference transmission imaging system 130 also provides reference images of the fluorescent sample 4 for comparison with the images of the fluorescent sample 4 determined by the controller 150.

From the foregoing description of the imaging system 102 of FIG. 21, one of ordinary skill in the art will understand that for each spatial pattern 111 of incident electromagnetic radiation, the illumination arrangement 110 may excite a narrower field of the fluorescent sample 4 than the wide-field temporal focusing illumination arrangement 10 of the illumination system 2 of FIG. 1. Consequently, it may be necessary to scan the beam provided by the illumination arrangement 110 over the fluorescent sample 4 to obtain the same field of view provided by the wide-field temporal focusing illumination arrangement 10 of the illumination system 2 of FIG. 1. The illumination system to FIG. 21 may include a tilting or scanning mirror arrangement (not shown) for this purpose. For a given field of view, this may result in longer measurement times (i.e. lower temporal resolution) when using the illumination arrangement 110 of the illumination system 102 of FIG. 21 compared with the illumination arrangement 10 of the illumination system 2 of FIG. 1. Conversely, for a given field of view, the imaging system 102 of FIG. 21 may require a lower laser power to generate the same amount of fluorescence in the fluorescent sample 4.

Other Modifications

It will be appreciated by one skilled in the art that various modifications may be made to the foregoing methods and systems without departing from the scope of the present invention as defined by the claims. For example, the scattering medium 6 may be fluorescent. The fluorescent sample 4 may scatter the excitation laser beam and/or the fluorescence generated in the fluorescent sample 4.

One or both of the fluorescent sample 4 and the scattering medium 6 may comprise biological material.

One or both of the fluorescent sample 4 and the scattering medium 6 may comprise human or animal tissue.

The fluorescent sample 4 and the scattering medium 6 may be unitary. For example, a sample may comprise a fluorescent sub-surface region and a scattering surface region.

One or both of the fluorescent sub-surface region of the sample and the scattering surface region of the sample may comprise biological material.

One or both of the fluorescent sub-surface region of the sample and the scattering surface region of the sample may comprise human or animal tissue.

Although the EMCCD cameras 28, 128 are operated as single pixel detectors, either of the EMCCD cameras 28, 128 may be replaced with an actual single pixel detector of any kind. This may be advantageous because a single pixel detector may be more sensitive and/or have a higher dynamic range than a multi-pixel detector.

Although the operating wavelength of each of the lasers 12, 112 of the imaging systems 2, 102 are selected for two-photon excitation of the fluorescent sample 4, the operating wavelength of each of the lasers 12, 112 may be selected for multi-photon excitation of the fluorescent sample 4 of any kind. In particular, the operating wavelength of each of the lasers 12, 112 may be selected for three-photon excitation of the fluorescent sample 4.

Although the imaging systems 2, 102 are arranged in an epi-fluorescence configuration for illuminating one side of the fluorescent sample 4 and collecting fluorescence from the same side of the fluorescent sample 4, the imaging systems 2, 102 could be re-arranged in a transmission configuration in which the fluorescence is collected from the side of the fluorescent sample 4 opposite to the illuminated side of the fluorescent sample 4. In other words, the reference transmission imaging systems 30, 130 shown in FIGS. 1 and 21 may be operated as detection arrangements which are additional or alternative to the detection arrangements 20, 120 described above. Under such circumstances, each CCD camera 36, 136 may be configured to operate as a single pixel detector and to measure the fluorescence 22, 122 for each Hadamard pattern 11, 111 used to illuminate the fluorescent sample 4. Each CCD camera 36, 136 may also be configured for communication with the corresponding controller 50, 150. The processing resources 150, 152 of the controllers 50, 150 may use the measured fluorescence 22, 122 for each Hadamard pattern 11, 111 to construct an image of the fluorescent sample 4 in a similar manner to that already described above in relation to the fluorescence 22, 122 measured using the EMCCD cameras 28, 128.

Although the fluorescent sample 4, the scattering medium 6 and the end of the illumination objective 18 adjacent to the scattering medium 6 are described above enclosed in a custom-made chamber filled with water 19, one of ordinary skill in the art will understand that one or more of the fluorescent sample 4, the scattering medium 6 and the end of the illumination objective 18 may not be enclosed in a chamber of any kind. One or more of the fluorescent sample 4, the scattering medium 6 and the end of the illumination objective 18 may not be immersed in water.

Although the systems and methods described above use a plurality of Hadamard radiation patterns, it should be understood that the systems and methods may use any orthonormal basis set of spatial radiation patterns. The plurality of spatial patterns of incident electromagnetic radiation may comprise a full orthonormal basis set of spatial radiation patterns. The plurality of spatial patterns of incident electromagnetic radiation may comprise a subset of a full orthonormal basis set of spatial radiation patterns.

The plurality of spatial patterns of incident electromagnetic radiation may comprise a plurality of binary spatial radiation patterns.

The plurality of spatial patterns of incident electromagnetic radiation may comprise Hermite-Gaussian modes, Laguerre-Gaussian modes, Bessel modes or eigenmodes such as optical eigenmodes.

Although the methods described above comprise constructing the image of the fluorescent sample from the plurality of measured fluorescence values using an orthogonal matching pursuit algorithm, it should be understood that other algorithms may be used to construct the image of the fluorescent sample from the plurality of measured fluorescence values.

The plurality of spatial patterns of incident electromagnetic radiation may comprise a plurality of greyscale spatial radiation patterns. For example, the plurality of spatial patterns of incident electromagnetic radiation may comprise a plurality of sinusoidal spatial radiation patterns, wherein each sinusoidal spatial radiation pattern has a different spatial frequency. The plurality of spatial patterns of incident electromagnetic radiation may comprise a number N of phase-shifting sinusoidal radiation patterns for each spatial frequency, wherein each phase-shifting sinusoidal radiation pattern has a phase shift of $2\pi/N$ relative to an adjacent one of the phase-shifting sinusoidal radiation patterns. The plurality of spatial patterns of incident electromagnetic radiation may comprise four phase-shifting sinusoidal radiation patterns for each spatial frequency, wherein each phase-shifting sinusoidal radiation pattern has a phase shift of $\pi/2$ relative to an adjacent one of the phase-shifting sinusoidal radiation patterns. The method may comprise constructing the image of the fluorescent sample from the plurality of measured fluorescence values by determining an inverse Fourier transform of the plurality of measured fluorescence values.

Although the methods described above comprise illuminating a fluorescent sample through the scattering medium with a plurality of spatial patterns of incident electromagnetic radiation for the multi-photon fluorescence excitation of the fluorescent sample, and measuring, for each spatial pattern of incident electromagnetic radiation, fluorescence generated by the fluorescent sample, one of ordinary skill in the art will understand that the sample need not be fluorescent and that the method may comprise illuminating the sample through the scattering medium with a plurality of spatial patterns of incident electromagnetic radiation, and measuring, for each spatial pattern of incident electromagnetic radiation, emitted electromagnetic radiation generated by the sample as a result of an interaction of the incident electromagnetic radiation with the sample, wherein the emitted electromagnetic radiation is not fluorescence.

One of ordinary skill in the art will also understand that the system for use in imaging a sample may be adapted according to the nature of the sample to be imaged and/or the nature of the interaction of the incident electromagnetic radiation with the sample which generates the emitted electromagnetic radiation. For example, the system may comprise an illumination arrangement for illuminating the sample through the scattering medium with a plurality of spatial patterns of incident electromagnetic radiation, which illumination arrangement is adapted according to the nature of the sample to be imaged and/or the nature of the interaction of the incident electromagnetic radiation with the sample which generates the emitted electromagnetic radiation. The illumination arrangement may include an optical source which is capable of producing a beam of incident electromagnetic radiation having properties such as wavelength, pulse duration and power which are selected according to the nature of the sample to be imaged and/or the nature of the interaction of the incident electromagnetic radiation with the sample which generates the emitted electromagnetic radiation. Similarly, the system may comprise a detection arrangement for measuring, for each spatial pattern of incident electromagnetic radiation, emitted electromagnetic radiation generated by the sample as a result of an interaction of the incident electromagnetic radiation with the sample, which detection arrangement is adapted according to the nature of the sample to be imaged and/or the nature of the interaction of the incident electromagnetic radiation with the sample which generates the emitted electromagnetic radiation. For example, the detection arrangement may include one or more suitable optical elements such as filters, spectrometers or the like for measuring, for each spatial pattern of incident electromagnetic radiation, the emitted electromagnetic radiation generated by the sample as a result of the interaction of the incident electromagnetic radiation with the sample.

The detection arrangement may be configured for measuring the emitted electromagnetic radiation generated by the sample without measuring a spatial distribution of the emitted electromagnetic radiation. The detection arrangement may comprise a single pixel detector for measuring the emitted electromagnetic radiation incident on the single pixel detector. The detection arrangement may comprise a multi-pixel detector having a plurality of pixels such as an image sensor, and wherein the detection arrangement is configured to measure the total emitted electromagnetic radiation incident on the plurality of pixels.

The incident electromagnetic radiation and the emitted electromagnetic radiation may have different spectra. The incident electromagnetic radiation may comprise light, for example infrared, visible or UV light. The emitted electromagnetic radiation may comprise light, for example infrared, visible or UV light. The emitted electromagnetic radiation may comprise THz radiation.

The emitted electromagnetic radiation may be generated by the sample as a result of a non-linear optical interaction of the incident electromagnetic radiation with the sample. The emitted electromagnetic radiation comprises a harmonic of the incident electromagnetic radiation, such as a second harmonic of the incident electromagnetic radiation or a third harmonic of the incident electromagnetic radiation.

The emitted electromagnetic radiation may be generated as a result of inelastic scattering by the sample.

The emitted electromagnetic radiation may be generated as a result of Raman scattering by the sample.

The emitted electromagnetic radiation may be generated as a result of coherent or stimulated Raman scattering by the sample.

The emitted electromagnetic radiation may be generated as a result of Coherent Anti-Stokes Raman Scattering (CARS) by the sample.

The invention claimed is:

1. A method for use in imaging a sample through a scattering medium, or for use in imaging a sub-surface region of a sample through a scattering surface region of the sample, the method comprising:
   illuminating the sample through the scattering medium, or illuminating the sub-surface region of the sample through the scattering surface region of the sample, with a plurality of spatial patterns of incident electromagnetic radiation, wherein each spatial pattern of incident electromagnetic radiation interacts with the sample, or the sub-surface region of the sample, to generate electromagnetic radiation in the sample or the sub-surface region of the sample;
   using single pixel detection to measure, for each spatial pattern of incident electromagnetic radiation, a corresponding value representative of a quantity of at least a portion of the emitted electromagnetic radiation; and
   using the plurality of spatial patterns of incident electromagnetic radiation and the plurality of corresponding measured values to determine an image of the sample, or an image of the sub-surface region of the sample, without using a spatial distribution of the emitted electromagnetic radiation, wherein the incident electromagnetic radiation comprises a range of different wavelengths and the method comprises:
dispersing the different wavelengths in the range of different wavelengths along different paths through the scattering medium and focusing the different wavelengths to the same focal plane or the same focal volume within the sample; or
dispersing the different wavelengths in the range of different wavelengths along different paths through the scattering surface region of the sample and focusing the different wavelengths to the same focal plane or the same focal volume within the sub-surface region of the sample.

2. The method of claim 1, wherein at least one of:
the plurality of spatial patterns of incident electromagnetic radiation comprises a set of mutually complementary spatial radiation patterns and/or a set of pairs of inverse spatial radiation patterns; and
the plurality of spatial patterns of incident electromagnetic radiation comprises a full orthonormal basis set of spatial radiation patterns or a subset of a full orthonormal basis set of spatial radiation patterns.

3. The method of claim 1, wherein the plurality of spatial patterns of incident electromagnetic radiation comprises a plurality of binary spatial radiation patterns.

4. The method of claim 1, wherein the plurality of spatial patterns of incident electromagnetic radiation comprises a set of Hadamard radiation patterns.

5. The method of claim 1, wherein using the plurality of spatial patterns of incident electromagnetic radiation and the plurality of corresponding measured values to determine the image of the sample or the image of the sub-surface region of the sample comprises using an image construction algorithm or an orthogonal matching pursuit algorithm to construct the image of the sample or the sub-surface region of the sample from the plurality of spatial patterns of incident electromagnetic radiation and the plurality of corresponding measured values.

6. The method of claim 1, wherein using single pixel detection to measure, for each spatial pattern of incident electromagnetic radiation, the corresponding value representative of a quantity of at least a portion of the emitted electromagnetic radiation comprises using a single pixel detector to measure, for each spatial pattern of incident electromagnetic radiation, the power or the intensity of the emitted electromagnetic radiation which is incident on the single pixel detector; or
wherein using single pixel detection to measure, for each spatial pattern of incident electromagnetic radiation, the corresponding value representative of a quantity of at least a portion of the emitted electromagnetic radiation comprises measuring, for each spatial pattern of incident electromagnetic radiation, the power or the intensity of the emitted electromagnetic radiation incident on a single pixel of a multi-pixel detector, or spatially integrating the power or the intensity of the emitted electromagnetic radiation incident on a plurality of the pixels of the multi-pixel detector.

7. The method of claim 1, comprising sequentially illuminating the sample through the scattering medium or sequentially illuminating the sub-surface region of the sample through the scattering surface region of the sample with the plurality of spatial patterns of incident electromagnetic radiation.

8. The method of claim 1, comprising:
illuminating one side of the sample through the scattering medium or one side of the sub-surface region of the sample through the scattering surface region of the sample; and
measuring the value representative of a quantity of at least a portion of the emitted electromagnetic radiation emitted from the same side of the sample through the same scattering medium or emitted from the same side of the sub-surface region of the sample through the same scattering surface region of the sample.

9. The method of claim 1, comprising using temporal focusing to focus each spatial pattern of incident electromagnetic radiation to the focal plane or the focal volume.

10. The method of claim 1, wherein at least one of:
the incident electromagnetic radiation and the emitted electromagnetic radiation have different spectra or one or more different wavelengths;
the incident electromagnetic radiation comprises light;
the incident electromagnetic radiation comprises infrared, visible or UV light;
the emitted electromagnetic radiation comprises light;
the incident electromagnetic radiation comprises infrared, visible or UV light; and
the emitted electromagnetic radiation comprises THz radiation.

11. The method of claim 1, wherein at least one of:
the emitted electromagnetic radiation comprises fluorescence generated by the sample or the sub-surface region of the sample as a result of excitation of the sample or the sub-surface region of the sample by the incident electromagnetic radiation;
the incident electromagnetic radiation is configured for two-photon excitation or three-photon excitation of the sample or the sub-surface region of the sample
the incident electromagnetic radiation includes an appropriate wavelength or range of wavelengths for two-photon excitation or three-photon excitation of the sample or the sub-surface region of the sample;
the sample or the sub-surface region of the sample is fluorescent;
the sample or the sub-surface region of the sample comprises one or more exogenous fluorophores or the fluorescent sample comprises one or more endogenous fluorophores; and
the scattering medium or the scattering surface region of the sample is fluorescent.

12. The method of claim 1, wherein the emitted electromagnetic radiation is generated by the sample or the sub-surface region of the sample as a result of a non-linear optical interaction between the incident electromagnetic radiation and the sample or the sub-surface region of the sample, or wherein the emitted electromagnetic radiation comprises at least one of a harmonic of the incident electromagnetic radiation, a second harmonic of the incident electromagnetic radiation, or a third harmonic of the incident electromagnetic radiation.

13. The method of claim 1, wherein at least one of:
the emitted electromagnetic radiation is generated as a result of inelastic scattering by the sample or the sub-surface region of the sample;
the emitted electromagnetic radiation is generated as a result of Raman scattering by the sample or the sub-surface region of the sample;
the emitted electromagnetic radiation is generated as a result of coherent or stimulated Raman scattering by the sample or the sub-surface region of the sample; and the emitted electromagnetic radiation is generated as a result of Coherent Anti-Stokes Raman Scattering (CARS) by the sample or the sub-surface region of the sample.

14. The method of claim 1, wherein at least one of:
the sample or the sub-surface region of the sample scatters the incident electromagnetic radiation and/or the emitted electromagnetic radiation generated by the sample or the sub-surface region of the sample;
one or both of the sample and the scattering medium comprises biological material or wherein one or both of the sub-surface region of the sample and the scattering surface region of the sample comprise biological material; and
one or both of the sample and the scattering medium comprises human or animal tissue or wherein one or both of the sub-surface region of the sample and the scattering surface region of the sample comprises human or animal tissue.

15. An imaging system for use in imaging a sample through a scattering medium, or for use in imaging a sub-surface region of a sample through a scattering surface region of the sample, the system comprising:
an illumination arrangement for illuminating the sample through the scattering medium, or illuminating the sub-surface region of the sample through the scattering surface region of the sample, with a plurality of spatial patterns of incident electromagnetic radiation, wherein each spatial pattern of incident electromagnetic radiation interacts with the sample, or the sub-surface region of the sample, to generate electromagnetic radiation in the sample or the sub-surface region of the sample;
a detection arrangement for measuring, for each spatial pattern of incident electromagnetic radiation, a corresponding value representative of a quantity of at least a portion of the emitted electromagnetic radiation using single pixel detection; and
a processing resource configured to use the plurality of spatial patterns of incident electromagnetic radiation and the plurality of corresponding measured values to determine an image of the sample, or an image of the sub-surface region of the sample, without using a spatial distribution of the emitted electromagnetic radiation,
wherein the illumination arrangement is configured to provide the incident electromagnetic radiation with a range of different wavelengths, and to:
disperse the different wavelengths in the range of different wavelengths along different paths through the scattering medium, and to focus the different wavelengths to the same focal plane or the same focal volume within the sample; or
disperse the different wavelengths in the range of different wavelengths along different paths through the scattering surface region of the sample, and to focus the different wavelengths to the same focal plane or the same focal volume within the sub-surface region of the sample.

16. The imaging system of claim 15, wherein the detection arrangement comprises a single pixel detector for measuring the power or intensity of the emitted electromagnetic radiation incident on the single pixel detector.

17. The imaging system of claim 15, wherein the detection arrangement comprises a multi-pixel detector having a plurality of pixels, and wherein the detection arrangement is configured to measure
the power or the intensity of the emitted electromagnetic radiation incident on a single pixel of the multi-pixel detector, or
to spatially integrate the power or the intensity of the emitted electromagnetic radiation incident on a plurality of the pixels of the multi-pixel detector.

18. The imaging system of claim 15, wherein the illumination arrangement is configured to sequentially illuminate the sample through the scattering medium or to sequentially illuminate the sub-surface region of the sample through the scattering surface region of the sample with the plurality of spatial patterns of incident electromagnetic radiation.

19. The imaging system of claim 15, wherein the illumination arrangement comprises a spatial modulation arrangement for imposing each spatial pattern onto a beam of incident electromagnetic radiation so as to provide the corresponding spatial pattern of incident electromagnetic radiation.

20. The imaging system of claim 19, wherein the spatial modulation arrangement comprises a diffractive spatial modulation arrangement or the spatial modulation arrangement comprises a spatial light modulator or a digital micromirror device.

21. The imaging system of claim 15, wherein the illumination arrangement is configured to use temporal focusing to focus each spatial pattern of incident electromagnetic radiation to the same focal plane or the same focal volume.

22. The imaging system of claim 15, wherein the illumination arrangement comprises a dispersive element or wherein the illumination arrangement comprises a diffraction grating.

23. The imaging system of claim 15, wherein the illumination arrangement is configured to illuminate one side of the sample through the scattering medium or one side of the sub-surface region of the sample through the scattering surface region of the sample, and wherein the detection arrangement is configured to measure the value representative of the quantity of at least a portion of the emitted electromagnetic radiation emitted from the same side of the sample through the same scattering medium or emitted from the same side of the sub-surface region of the sample through the same scattering surface region of the sample.

24. The imaging system of claim 15, wherein the illumination arrangement comprises a source for emitting the beam of incident electromagnetic radiation, wherein the source is coherent and/or wherein the source is tuneable.

* * * * *